(12) United States Patent
Manabe et al.

(10) Patent No.: US 9,649,829 B2
(45) Date of Patent: May 16, 2017

(54) FILM FOR FORMING AND FORMING TRANSFER FOIL USING SAME

(76) Inventors: Isao Manabe, Otsu (JP); Mitsutaka Sakamoto, Otsu (JP); Kozo Takahashi, Otsu (JP); Toshiya Ieki, Otsu (JP); Nobuyuki Sato, Otsu (JP); Shinji Takauchi, Otsu (JP)

(*) Notice: Subject to any disclaimer, the term of this patent is extended or adjusted under 35 U.S.C. 154(b) by 387 days.

(21) Appl. No.: 14/235,861

(22) PCT Filed: Aug. 1, 2012

(86) PCT No.: PCT/JP2012/069560
§ 371 (c)(1),
(2), (4) Date: Jan. 29, 2014

(87) PCT Pub. No.: WO2013/027547
PCT Pub. Date: Feb. 28, 2013

(65) Prior Publication Data
US 2014/0170379 A1    Jun. 19, 2014

(30) Foreign Application Priority Data
Aug. 25, 2011  (JP) .................. 2011-183614

(51) Int. Cl.
*B32B 27/08* (2006.01)
*B32B 27/32* (2006.01)
*C08J 5/18* (2006.01)
*C08F 32/00* (2006.01)
*C08K 5/098* (2006.01)
*C08L 45/00* (2006.01)

(52) U.S. Cl.
CPC ............ *B32B 27/325* (2013.01); *B32B 27/08* (2013.01); *C08F 32/00* (2013.01); *C08J 5/18* (2013.01); *C08K 5/098* (2013.01); *C08L 45/00* (2013.01); *B32B 2307/50* (2013.01); *B32B 2307/51* (2013.01); *B32B 2307/538* (2013.01); *B32B 2307/738* (2013.01); *B32B 2307/746* (2013.01); *C08J 2365/00* (2013.01); *Y10T 428/2495* (2015.01); *Y10T 428/24355* (2015.01); *Y10T 428/2848* (2015.01); *Y10T 428/31913* (2015.04)

(58) Field of Classification Search
CPC .................. B32B 27/325; Y10T 428/24355
See application file for complete search history.

(56) References Cited

U.S. PATENT DOCUMENTS

| 6,017,616 A * | 1/2000 | Kochem ................. B32B 27/32 156/244.11 |
|---|---|---|
| 6,433,081 B1 | 8/2002 | Tokunaga et al. |
| 6,566,447 B1 | 5/2003 | Tokunaga et al. |
| 2004/0013862 A1 | 1/2004 | Brebion |
| 2006/0272768 A1 | 12/2006 | Kitamura et al. |
| 2006/0280915 A1 | 12/2006 | Kitamura et al. |
| 2010/0225032 A1* | 9/2010 | Nakane .................. C08L 45/00 264/537 |

FOREIGN PATENT DOCUMENTS

| EP | 1 674 230 A1 | 6/2006 |
|---|---|---|
| EP | 2 208 757 A1 | 7/2010 |
| EP | 2 617 758 | 7/2013 |
| JP | 2001-347565 | 12/2001 |
| JP | 2004-188708 | 7/2004 |
| JP | 2005-162965 | 6/2005 |
| JP | 2006-257399 | 9/2006 |
| JP | 2007-246910 | 9/2007 |
| JP | 2008-095084 | 4/2008 |
| WO | WO 2012/035956 | 8/2011 |

OTHER PUBLICATIONS

European Search Report for EP 12 82 5899.3, Based Upon PCT/JP2012069560, and Issued February 19, 2015.
International Search Report for PCT/JP2012/069560 (With English Translation); Japanese Patent Office, Nov. 6, 2012.

* cited by examiner

*Primary Examiner* — William P Watkins, III
(74) *Attorney, Agent, or Firm* — RatnerPrestia

(57) ABSTRACT

The present invention provides a film for forming which exhibits both excellent dimensional stability in processing and excellent formability as well as excellent appearance of surfaces and can thus be suitably applied to a variety of forming members through forming and used in forming decoration applications. Provided is a film for forming comprising a cyclic olefin-based resin as a main component, wherein the storage modulus at 120° C. is 101 MPa to 3,000 MPa and the storage modulus at 170° C. is 100 MPa or less.

11 Claims, No Drawings

FILM FOR FORMING AND FORMING TRANSFER FOIL USING SAME

CROSS REFERENCE TO RELATED APPLICATIONS

This is the U.S. National Phase application of PCT International Application No. PCT/JP2012/069560, filed Aug. 1, 2012, and claims priority to Japanese Patent Application No. 2011-183614, filed Aug. 25, 2011, the disclosures of each of these applications being incorporated herein by reference in their entireties for all purposes.

FIELD OF THE INVENTION

The present invention relates to a film for forming which comprises a cyclic olefin-based resin as a main component, wherein the storage moduli at 120° C. and 170° C. are controlled to be 101 MPa to 3,000 MPa and 100 MPa or less, respectively, so as to allow the film to have good appearance of surfaces and show both excellent dimensional stability in processing and excellent formability at high temperatures.

BACKGROUND OF THE INVENTION

In recent years, due to increasing environmental awareness, in the fields of building materials, automotive parts, cellular phones, electric appliances and the like, there is an increased demand for solvent-less coating and plating alternatives and introduction of a decoration method using a film has been more advanced.

Under such circumstances, several proposals have been made as biaxially-stretched polyester films for forming. For example, there are proposed a polyester film forming in which a specific forming stress at normal temperature is defined (see, for example, Patent Document 1) and a polyester film for forming in which the forming stress, thermal shrinkage and planar orientation degree at 25° C. and 100° C. are defined (see, for example, Patent Document 2).

In addition, there is proposed an unstretched polyester film for forming which shows excellent formability at low temperatures and utilizes an amorphous polyester (see, for example, Patent Document 3) and, as a film for transfer foil which can be used for printing process and coating process, a film in which a polyolefin film is laminated onto at least one side of an unstretched polyester film is proposed (see, for example, Patent Document 4). Moreover, there is proposed a forming release film as a film comprising a cyclic olefin-based resin (Patent Document 5) and, as a cyclic olefin-based film for cosmetic sheet, a film in which polyethylene is blended with a cyclic olefin is also proposed (see, for example, Patent Document 6).

PATENT DOCUMENTS

[Patent Document 1] JP 2001-347565 A
[Patent Document 2] JP 2008-095084 A
[Patent Document 3] JP 2007-246910 A
[Patent Document 4] JP 2004-188708 A
[Patent Document 5] JP 2006-257399 A
[Patent Document 6] JP 2005-162965 A

SUMMARY OF THE INVENTION

Since the films described in Patent Documents 1 and 2 are biaxially-stretched polyester films, although they both have excellent thermostability, these films do not have sufficient formability at low temperatures.

The film described in Patent Document 3 has low resistance to solvents and thus cannot endure printing and coating processes.

The film described in Patent Document 4 has poor appearance of surfaces because of the use of a polypropylene as polyolefin; therefore, it is difficult to expand the use of this film to an application where good appearance of surfaces is demanded.

Those films described in Patent Documents 5 and 6 do not have such a design that is thoroughly considered for processability and formability.

Thus, the present invention aims to provide a film for forming which exhibits both excellent dimensional stability in processing and excellent formability at high temperatures as well as excellent appearance of surfaces and can thus be suitably applied to a variety of forming members through forming and used in, for example, forming release applications and forming decoration applications.

In order to solve the above-described problems, the present invention includes the following means.

(1) A film for forming comprising a cyclic olefin-based resin as a main component, wherein the storage modulus at 120° C. is 101 MPa to 3,000 MPa and the storage modulus at 170° C. is 100 MPa or less.

(2) The film for forming according to (1), which is a laminated film in which a cyclic olefin layer (layer B) comprising a cyclic olefin-based resin as a main component is laminated on at least one side of a cyclic olefin layer (layer A) comprising a cyclic olefin-based resin as a main component, wherein the above-described layer A comprises a polyethylene-based resin and/or a polypropylene-based resin in an amount of 1 to 40% by mass with respect to 100% by mass of the whole layer A.

(3) The film for forming according to (2), having a three-layer constitution of the layer B/the layer A/the layer B.

(4) The film for forming according to (2) or (3), wherein the glass transition temperature of the layer B is higher than that of the layer A.

(5) The film for forming according to any one of (2) to (4), wherein the layer A has a glass transition temperature of 111° C. to 165° C.

(6) The film for forming according to any one of (2) to (5), wherein the glass transition temperature of the layer B is 115° C. to 170° C. and higher than that of the layer A.

(7) The film for forming according to any one of (1) to (6), wherein a temperature at which the storage modulus is 1,000 MPa (T1: ° C.) and a temperature at which the storage modulus is 100 MPa (T2: ° C.) satisfy the following formula (I):

$$T2 - T1 \geq 10 \quad (I)$$

(8) The film for forming according to any one of (3) to (7), wherein the thickness ratio of the above-described layer A and layer B (total thickness of the layer B/total thickness of the layer A) is 0.25 to 1.

(9) The film for forming according to any one of (1) to (8), wherein one surface of the film (surface X) has a surface roughness (SRa) of 2 nm to less than 50 nm and the other surface (surface Y) has a surface roughness (SRa) of 50 nm to 1,000 nm.

(10) The film for forming according to any one of (1) to (9), wherein one surface of the film (surface X) has a surface roughness (SRmax) of 20 nm to less than 500 nm and the other surface (surface Y) has a surface roughness (SRmax) of 500 nm to 10,000 nm.

(11) The film for forming according to any one of (1) to (10), which contains an antioxidizing agent and/or a metal salt of a fatty acid in an amount of 0.005% by mass to 0.5% by mass with respect to 100% by mass of all components contained in the film.

(12) The film for forming according to any one of (1) to (11), which has a tensile elongation at break of not less than 300% at 160° C. in at least one direction.

(13) The film for forming according to any one of (1) to (12), which is a film for a forming transfer foil.

(14) A forming transfer foil, sequentially comprising a clear coated layer, a decoration layer and an adhesion layer on at least one side of the film for forming according to any one of (1) to (13).

The film for forming of the present invention preferably comprises a cyclic olefin-based resin as a main component and has a storage modulus of 101 MPa to 3,000 MPa at 120° C. and 100 MPa or less at 170° C. By having this constitution, the film for forming of the present invention shows excellent dimensional stability in processings such as coating, lamination, printing and vapor-deposition and, by elevating the forming temperature in a variety of forming methods such as vacuum forming, pressure forming and press forming, the film for forming of the present invention can achieve good formability. Therefore, the film for forming of the present invention can be applied to a variety of forming processes and suitably used in, for example, decoration and functionalization of forming members of building materials, automotive components, cellular phones, electric appliances, amusement machine parts and the like.

DETAILED DESCRIPTION OF EMBODIMENTS OF THE INVENTION

The film for forming according to embodiments of the present invention contains a cyclic olefin-based resin as a main component. In the present invention, it was discovered that a design in which dimensional stability in processings such as coating, lamination, printing and vapor-deposition, and deep-drawing formability are both satisfied can be attained by applying a film comprising a cyclic olefin-based resin as a main component as a film for forming. In addition, by using a cyclic olefin-based resin, the resulting forming member is provided with good appearance of surfaces.

The term "comprising a cyclic olefin-based resin as a main component" used herein means that, taking the total amount of all components contained in the film as 100% by mass, the film contains a cyclic olefin-based resin in an amount of 50% by mass to 100% by mass.

A preferred embodiment of the present invention is a laminated film in which the below-described layer B is laminated on at least one side of the below-described layer A and, in the case of such a laminated film, the above-described term means that, taking the total amount of all components contained in all of the layers constituting the laminated film as 100% by mass, the total amount of cyclic olefin-based resin contained in all of the layers is 50% by mass to 100% by mass.

Taking the total amount of all components of the film as 100% by mass, the film contains a cyclic olefin-based resin in an amount of 70% by mass to 100% by mass in a more preferred embodiment, 80% by mass to 100% by mass in a still more preferred embodiment, and 90% by mass to 100% by mass in the most preferred embodiment.

In the present invention, the term "cyclic olefin-based resin" refers to a resin having an alicyclic structure in the main chain of a polymer, which is obtained by polymerization of a cyclic olefin monomer.

Examples of the cyclic olefin monomer include monocyclic olefins such as cyclobutene, cyclopentene, cycloheptene, cyclooctene, cyclopentadiene and 1,3-cyclohexadiene; bicyclic olefins such as bicyclo[2,2,1]hept-2-ene, 5-methyl-bicyclo[2,2,1]hepta-2-ene, 5,5-dimethyl-bicyclo[2,2,1]hept-2-ene, 5-ethyl-bicyclo[2,2,1]hept-2-ene, 5-butyl-bicyclo[2,2,1]hept-2-ene, 5-ethylidene-bicyclo[2,2,1]hept-2-ene, 5-hexyl-bicyclo[2,2,1]hept-2-ene, 5-octyl-bicyclo[2,2,1]hept-2-ene, 5-octadecyl-bicyclo[2,2,1]hept-2-ene, 5-methylidene-bicyclo[2,2,1]hept-2-ene, 5-vinyl-bicyclo[2,2,1]hept-2-ene and 5-propenyl-bicyclo[2,2,1]hept-2-ene; tricyclic olefins such as tricyclo[4,3,0,1$^{2.5}$]deca-3,7-diene, tricyclo[4,3,0,1$^{2.5}$]deca-3-ene, tricyclo[4,3,0,1$^{2.5}$]undeca-3,7-diene, tricyclo[4,3,0,1$^{2.5}$]undeca-3,8-diene, tricyclo[4,3,0,1$^{2.5}$], a partially hydrogenated product thereof (or an adduct of cyclopentadiene and cyclohexene) which is tricyclo[4,3,0,1$^{2.5}$]undeca-3-ene, 5-cyclopentyl-bicyclo[2,2,1]hept-2-ene, 5-cyclohexyl-bicyclo[2,2,1]hept-2-ene, 5-cyclohexenyl-bicyclo[2,2,1]hept-2-ene and 5-phenyl-bicyclo[2,2,1]hepta-2-ene; tetracyclic olefins such as tetracyclo[4,4,0,1$^{2.5}$,1$^{7.10}$]dodeca-3-ene, 8-methyl-tetracyclo[4,4,0,1$^{2.5}$,1$^{7.10}$]dodeca-3-ene, 8-ethyl-tetracyclo[4,4,0,1$^{2.5}$,1$^{7.10}$]dodeca-3-ene, 8-methylidene-tetracyclo[4,4,0,1$^{2.5}$,1$^{7.10}$]dodeca-3-ene, 8-vinyl-tetracyclo[4,4,0,1$^{2.5}$,1$^{7.10}$]dodeca-3-ene and 8-propenyl-tetracyclo[4,4,0,1$^{2.5}$,1$^{7.10}$]dodeca-3-ene; and polycyclic olefins, for example, tetramers such as 8-cyclopentyl-tetracyclo[4,4,0,1$^{2.5}$,1$^{7.10}$]dodeca-3-ene, 8-cyclohexyl-tetracyclo[4,4,0,1$^{2.5}$,1$^{7.10}$]dodeca-3-ene, 8-cyclohexenyl-tetracyclo[4,4,0,1$^{2.5}$,1$^{7.10}$]dodeca-3-ene, 8-phenyl-cyclopentyl-tetracyclo[4,4,0,1$^{2.5}$,1$^{7.10}$]dodeca-3-ene, tetracyclo[7,4,1$^{3.6}$,0$^{1.9}$,0$^{2.7}$]tetradeca-4,9,11,13-tetraene, tetracyclo[8,4,1$^{4.7}$,0$^{1.10}$,0$^{3.8}$]pentadeca-5,10,12,14-tetraene, pentacyclo[6,6,1$^{3.6}$,0$^{2.7}$,0$^{9.14}$]-4-hexadecene, pentacyclo[6,5,1,1$^{3.6}$, 0$^{2.7}$,0$^{9.13}$]-4-pentadecene, pentacyclo[7,4,0,0$^{2.7}$, 1$^{3.6}$,1$^{10.13}$]-4-pentadecene, heptacyclo[8,7,0,1$^{2.9}$,1$^{4.7}$,1$^{11.17}$, 0$^{3.8}$,0$^{12.16}$]-5-eicosene, heptacyclo[8,7,0,1$^{2.9}$,1$^{3.8}$,1$^{4.7}$,0$^{12.17}$, 0$^{13.16}$]-14-eicosene and cyclopentadiene. These cyclic olefin monomers may be used individually, or two or more thereof may be used in combination.

Among the above-described cyclic olefin monomers, from the standpoints of the productivity and the surface properties, bicyclo[2,2,1]hept-2-ene (hereinafter, referred to as "norbornene"), a tricyclic olefin having 10 carbon atoms (hereinafter, referred to as "tricyclodecene") such as tricyclo[4,3,0,1$^{2.5}$]deca-3-ene, a tetracyclic olefin having 12 carbon atoms (hereinafter, referred to as "tetracyclododecene") such as tetracyclo[4,4,0,1$^{2.5}$,1$^{7.10}$]dodeca-3-ene, cyclopentadiene or 1,3-cyclohexadiene is preferably used.

Thereamong, from the standpoints of the productivity and the surface properties, bicyclo[2,2,1]hept-2-ene is particularly preferably used.

Further, a resin obtained by copolymerizing a cyclic olefin-based resin and a chained olefin monomer can be used as well. In this case, examples of preferred chained olefin monomer include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene.

Among the above-described cyclic olefin monomers, from the standpoints of the productivity and the surface properties, bicyclo[2,2,1]hept-2-ene (hereinafter, referred to as "norbornene"), cyclopentadiene, 1,3-cyclohexadiene or a derivative thereof is preferably used.

The cyclic olefin-based resin may also be either a resin obtained by polymerization of the above-described cyclic olefin monomer alone or a resin obtained by copolymerization of the above-described cyclic olefin and a chained olefin monomer.

Examples of a method of producing a resin by polymerization of a cyclic olefin monomer alone include known methods such as addition polymerization and ring-opening polymerization of cyclic olefin monomers, more specifically, a method in which norbornene and a derivative thereof are subjected to ring-opening metathesis polymerization and then hydrogenated; a method in which norbornene and a derivative thereof are subjected to addition polymerization; and a method in which cyclopentadiene and cyclohexadiene are subjected to 1,2- or 1,4-addition polymerization and then hydrogenated. Among those resins that are produced by such methods, from the standpoints of the productivity, surface properties and formability, a resin obtained by ring-opening metathesis polymerization of norbornene and a derivative thereof and subsequent hydrogenation is most preferred.

In cases where the resin is obtained by copolymerization of a cyclic olefin monomer and a chained olefin monomer, preferred examples of the chained olefin monomer include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosen. Thereamong, from the standpoints of the productivity and the cost, ethylene can be particularly preferably used. Further, examples of a method of producing a resin by copolymerization of a cyclic olefin monomer and a chained olefin monomer include known methods such as addition polymerization between a cyclic olefin monomer and a chained olefin monomer, more specifically, a method in which norbornene, a derivative thereof and ethylene are subjected to addition polymerization. Among those resins that are produced by such method, from the standpoints of the productivity, surface properties and formability, a copolymer of norbornene and ethylene is most preferred.

The cyclic olefin-based resin may also contain a polar group from the standpoint of attaining good adhesion between a film produced therefrom and a coating film. Examples of the polar group include carboxyl group, acid anhydride group, epoxy group, amide group, ester group and hydroxyl group. Examples of a method for incorporating a polar group into the cyclic olefin-based resin include a method where a polar group-containing unsaturated compound is graft-polymerized and/or copolymerized. Examples of the polar group-containing unsaturated compound include (meth)acrylic acid, maleic acid, maleic acid anhydride, itaconic acid anhydride, glycidyl (meth)acrylate, (meth)acrylic acid alkyl (C1 to C10) ester, maleic acid alkyl (C1 to C10) ester, (meth)acrylamide and 2-hydroxyethyl (meth)acrylate.

Here, the term "cyclic olefin-based resin" used in the present invention means a polymer of a cyclic olefin-based resin which contains cyclic olefin monomer-derived components in a total amount of 50% by mass to 100% by mass with respect to 100% by mass of the polymer.

Further, the film for forming of the present invention may be constituted by a cyclic olefin-based resin(s) alone or may also contain other olefin-based resin(s) or a resin other than olefin-based resin, as long as the film contains a cyclic olefin-based resin in an amount of 50% by mass to 100% by mass, taking the total amount of all components of the film as 100% by mass. As an olefin-based resin other than cyclic olefin-based resin, for example, a variety of polyethylene-based resins such as low-density polyethylenes, medium-density polyethylenes, high-density polyethylenes, linear low-density polyethylenes and ethylene-α olefin copolymers produced by polymerization using a metallocene catalyst (it is noted here, however, that the olefin-based resin is a polypropylene-based resin when propylene is contained as a monomer unit and it is a polyethylene-based resin when propylene is not contained as a monomer unit) and a variety of polypropylene-based resins such as polypropylenes, ethylene-propylene copolymers and ethylene-propylene-butene copolymers as well as polyolefin-based resins such as methylpentene polymers can be used. In addition, polymers composed of an α-olefin monomer, such as ethylene, propylene, butene-1, pentene-1,4-methylpentene-1, hexene-1 or octene-1, and random copolymers and block copolymers that are composed of such α-olefin monomers can also be used. Thereamong, from the standpoint of the compatibility with a cyclic olefin-based resin, as the olefin-based resin other than cyclic olefin-based resin, a variety of polyethylene-based resins and polypropylene-based resins are preferably used.

It is preferred that a polyethylene-based resin and/or a polypropylene-based resin be incorporated into the film for forming of the present invention comprising a cyclic olefin-based resin as a main component because, by this, not only the shearing stress in the extrusion step can be reduced and generation of specks caused by formation of bridged structures can be inhibited, but also the toughness can be improved. On the other hand, when the content of the polyethylene-based resin and/or the polypropylene-based resin is high, the shape stability tends to be impaired. From the standpoints of the quality, toughness and shape stability, the content of the polyethylene-based resin and/or the polypropylene-based resin is preferably 1 to 40% by mass, more preferably 1 to 30% by mass, most preferably 1 to 20% by mass, with respect to 100% by mass of all components contained in the film. Among polyethylene-based resins and polypropylene-based resins, from the standpoint of the compatibility with a cyclic olefin-based resin, a polyethylene-based resin is preferably used and a high-density polyethylene or a linear low-density polyethylene is more preferably used, and it is most preferred to use a linear low-density polyethylene. Here, in cases where the film contains both a polyethylene-based resin and a polypropylene-based resin, the total amount of the polyethylene-based resin and the polypropylene-based resin is in the above-described range, that is, preferably 1 to 40% by mass, more preferably 1 to 30% by mass, most preferably 1 to 20% by mass, with respect to 100% by mass of all components contained in the film.

Here, the term "polyethylene-based resin" used in the present invention means a polymer having a mode in which a total of 50% by mass to 100% by mass of ethylene-derived components is contained in 100% by mass of a polyethylene-based resin.

Further, the term "polypropylene-based resin" used in the present invention means a polymer having a mode in which a total of 50% by mass to 100% by mass of propylene-derived components is contained in 100% by mass of a polypropylene-based resin.

In the film for forming according to preferred embodiments of the present invention, from the standpoints of the dimensional stability in processing and the formability, the storage modulus at 120° C. is required to be 101 MPa to 3,000 MPa. By controlling the storage modulus at 120° C. to be not less than 101 MPa, exceptionally good dimensional stability can be achieved during processings such as coating, lamination, printing and vapor deposition. Particularly, by setting the drying temperature after coating and printing to be higher, the line speed of the drying step can be increased and there is thus an advantage that the processing cost can be reduced. Since the film for forming of the present invention can show a high storage modulus of not less than 101 MPa also at a high temperature such as 120° C., the drying temperature after coating and printing can be set higher. In addition, the higher the storage modulus at 120° C. is, the better is the dimensional stability, which is preferred; however, when it is tried to control the storage modulus to be 3,000 MPa or higher, the formability may be impaired. In order to attain a further improvement in both the dimensional stability and the formability, the storage modulus at 120° C. is more preferably 500 MPa to 3,000 MPa, most preferably 1,000 MPa to 3,000 MPa.

As a method of controlling the storage modulus at 120° C. of the film for forming of the present invention in the above-described range of 1,000 MPa to 3,000 MPa, it is preferred to adjust the total thickness of layers having a glass transition temperature of 120° C. or higher to be not less than 50%, taking the total thickness of the film as 100%. In cases where there is only one layer having a glass transition temperature of 120° C. or higher, the term "total thickness of layers having a glass transition temperature of 120° C. or higher" used herein refers to the thickness of the layer itself and, in cases where there are plural layers that have a glass transition temperature of 120° C. or higher, the term refers to the sum of the thicknesses of these layers.

In the present invention, the method of controlling the glass transition temperature is not particularly restricted. For example, in cases where a copolymer of norbornene and ethylene is used as the cyclic olefin-based resin, the glass transition temperature of the film can be elevated by increasing the norbornene content. Further, the glass transition temperature of the film can be adjusted also by blending two kinds of cyclic olefin-based resins having different norbornene contents. Moreover, for example, in cases where a resin obtained by ring-opening metathesis polymerization of a norbornene derivative and subsequent hydrogenation of the resulting polymerization product is used as the cyclic olefin-based resin, the glass transition temperature can be elevated by increasing the molecular weight of the norbornene derivative (for example, by increasing the molecular weight of the side chain or by allowing it to have a bicyclic structure). Furthermore, the glass transition temperature of a layer can be adjusted also by blending two kinds of resins having different glass transition temperatures that are obtained by ring-opening metathesis polymerization of a norbornene derivative and subsequent hydrogenation of the resulting polymerization product. Meanwhile, the glass transition temperature can be lowered by adding a polyethylene-based resin and/or a polypropylene-based resin. It is more preferred that the total thickness of layers having a glass transition temperature of 125° C. or higher be not less than 50%, taking the total thickness of the film as 100%. Here, in cases where there are plural glass transition temperatures such as a case where a plurality of resins are mixed in one layer, the highest one is defined as the glass transition temperature of the layer.

In the film for forming according to preferred embodiments of the present invention, from the standpoint of the formability, the storage modulus at 170° C. is 100 MPa or less. When the storage modulus at 170° C. is 100 MPa or less, excellent formability can be achieved by setting at least the forming temperature at 170° C. or higher, which is preferred. In cases where even higher formability is required, the storage modulus at 170° C. is preferably 50 MPa or less, most preferably 20 MPa or less. Further, as the lower limit of the storage modulus, from the standpoint of inhibiting biased change in shape during forming, it is preferred that the storage modulus be 0.5 MPa or higher.

As a method of controlling the storage modulus at 170° C. of the film for forming of the present invention in the above-described range of 100 MPa or less, it is preferred to adjust the total thickness of layers having a glass transition temperature of 170° C. or lower to be not less than 50%, taking the total thickness of the film as 100%. In cases where there are plural glass transition temperatures such as a case where a plurality of resins are mixed in one layer, the highest one is defined as the glass transition temperature of the layer.

Here, the condition in which the storage modulus at 120° C. is 101 MPa to 3,000 MPa and the storage modulus at 170° C. is 100 MPa or less means that the above-described numerical values are satisfied in an arbitrary direction of the film and the direction perpendicular thereto.

Further, in the film for forming of the present invention, when importance is attached to the dimensional stability during processing, it is preferred that the storage modulus at 130° C. be 101 MPa to 3,000 MPa. By controlling the storage modulus at 130° C. to be 101 MPa or higher, the temperatures of the processing steps such as coating, lamination, printing and vapor deposition can be set even higher, which is preferred. The storage modulus at 130° C. is more preferably 500 MPa to 3,000 MPa, still more preferably 1,000 MPa to 3,000 MPa.

As a method of controlling the storage modulus at 130° C. in the above-described range of 101 MPa to 3,000 MPa, it is preferred to adjust the total thickness of layers having a glass transition temperature of 130° C. or higher to be not less than 50%, taking the total thickness of the film as 100%.

In the film for forming of the present invention, importance is given to the dimensional stability during processing and, in order to shorten the preheating time in the forming step and to thereby reduce the forming tact time, it is preferred that the forming temperature be as low as possible. Therefore, in the film for forming of the present invention, it is preferred that the storage modulus at 160° C. be 100 MPa or less and it is more preferred that the storage modulus at 150° C. be 100 MPa or less. As a method of controlling the storage modulus at 160° C. of the film for forming of the present invention in the above-described range of 100 MPa or less, it is preferred to adjust the total thickness of layers having a glass transition temperature of 160° C. or lower to be not less than 50%, taking the total thickness of the film as 100% and, as a method of controlling the storage modulus at 150° C. in the above-described range of 100 MPa or less, it is more preferred to adjust the total thickness of layers having a glass transition temperature of 150° C. or lower to be not less than 50%, taking the total thickness of the film as 100%.

In order to attain all of the toughness, quality and appearance of surfaces at satisfactory levels, it is preferred that the film for forming of the present invention be a laminated film in which a cyclic olefin layer (layer B) comprising a cyclic olefin-based resin as a main component is laminated on at least one side of a cyclic olefin layer (layer A) comprising a cyclic olefin-based resin as a main component, wherein the above-described layer A comprises a polyethylene-based resin and/or a polypropylene-based resin in an amount of 1 to 40% by mass with respect to 100% by mass of the whole layer A. That is, in cases where the layer A contains only either a polyethylene-based resin or a polypropylene-based resin, the content thereof is preferably 1 to 40% by mass with respect to 100% by mass of the whole layer A. Here, in cases where the layer A contains both a polyethylene-based resin and a polypropylene-based resin, the total content thereof is in the above-described range, that is, 1 to 40% by mass with respect to 100% by mass of the whole layer A.

The phrase "a cyclic olefin layer (layer A) comprising a cyclic olefin-based resin as a main component" used herein means that, taking the total amount of all components contained in the layer A as 100% by mass, the layer A contains a cyclic olefin-based resin in an amount of 50% by mass to 100% by mass.

Further, the phrase "a cyclic olefin layer (layer B) comprising a cyclic olefin-based resin as a main component" used herein means that, taking the total amount of all components contained in the layer B as 100% by mass, the layer B contains a cyclic olefin-based resin in an amount of 50% by mass to 100% by mass.

Cyclic olefin-based resins have a lower toughness as compared to polyethylene-based resins and polypropylene-based resins; however, by incorporating a polyethylene-based resin and/or a polypropylene-based resin, the toughness of the film can be improved. Meanwhile, an addition of a polyethylene-based resin and/or a polypropylene-based resin tends to impair the appearance of surfaces. Therefore, in order to attain both the toughness and the appearance of surfaces at satisfactory levels, it is preferred that the film for forming of the present invention have a constitution of a laminated film in which a cyclic olefin layer (layer B) comprising a cyclic olefin-based resin as a main component is laminated on at least one side of a cyclic olefin layer (layer A) comprising a cyclic olefin-based resin as a main component, wherein the above-described layer A comprises a polyethylene-based resin and/or a polypropylene-based resin in an amount of 1 to 40% by mass with respect to 100% by mass of the whole layer A.

Further, from the standpoints of the toughness and shape stability, the amount of the polyethylene-based resin and/or the polypropylene-based resin in the layer A is preferably 1 to 30% by mass, most preferably 1 to 20% by mass, with respect to 100% by mass of the whole layer A.

Moreover, from the standpoints of the appearance of surfaces, the content of the polyethylene-based resin and/or the polypropylene-based resin in the cyclic olefin layer comprising a cyclic olefin-based resin as a main component (layer B) is preferably 0% by mass to 10% by mass, more preferably 0% by mass to 5% by mass, most preferably 0% by mass, with respect to 100% by mass of the whole layer B.

In the above-described constitution, from the standpoints of the toughness, shape stability and appearance of surfaces, the thickness ratio (total thickness of layer B/total thickness of layer A) is preferably 0.25 to 1. Here, in cases where the film has only one layer B, the term "total thickness of layer B" refers to the thickness of the layer B itself and, in cases where the film has two or more layer Bs, the term refers to the total thickness of all of the layer Bs. Further, in cases where the film has only one layer A, the term "total thickness of layer A" refers to the thickness of the layer A itself and, in cases where the film has two or more layer As, the term refers to the total thickness of all of the layer As. The thickness ratio (total thickness of layer B/total thickness of layer A) is more preferably 0.4 to 0.8. The thickness ratio of a film can be measured by observing a cross-section of the film under a scanning electron microscope, a transmission electron microscope, a light microscope or the like at a magnification of ×500 to ×10,000.

In cases where the film for forming of the present invention has a laminated structure, in order to further improve the ease of handling, the laminated structure preferably has a three-layer constitution of layer B/layer A/layer B rather than a bilayer constitution of layer A/layer B.

In the film for forming of the present invention, from the standpoints of the dimensional stability in processing and the formability, it is preferred that the glass transition temperature of the above-described layer B be higher than that of the above-described layer A. By controlling the glass transition temperature of the layer B to be higher than that of the layer A, satisfactory dimensional stability and formability in processing can both be attained and the outer appearance of the formed film can be improved as well, which are preferred.

Further, in cases where the film for forming of the present invention has a laminated structure, from the standpoints of the dimensional stability in processing and the formability, it is preferred that the above-described layer A have a glass transition temperature (TgA) of 111° C. to 165° C. By controlling the glass transition temperature of the layer A to be not lower than 111° C., dimensional change during processings such as coating, lamination, printing and vapor deposition can be preferably inhibited. Further, by controlling the glass transition temperature of the layer A to be not higher than 165° C., excellent formability can be preferably achieved while maintaining the dimensional stability. In order to attain both the dimensional stability and the formability at even higher levels, the glass transition temperature of the layer A is more preferably 115° C. to 150° C., most preferably 120° C. to 140° C. In cases where plural values are obtained when the glass transition temperature of the layer A is measured, the term "glass transition temperature of the layer A" used herein means the highest one of the measured values.

In order to control the glass transition temperature of the layer A to be 111° C. to 165° C., for example, in cases where a copolymer of norbornene and ethylene is used as the cyclic olefin-based resin, the glass transition temperature can be elevated by increasing the norbornene content. Further, the glass transition temperature of the film can be adjusted also by blending two kinds of cyclic olefin-based resins having different norbornene contents. Moreover, in cases where a resin obtained by ring-opening metathesis polymerization of a norbornene derivative and subsequent hydrogenation of the resulting polymerization product is used as the cyclic olefin-based resin, the glass transition temperature can be elevated by increasing the molecular weight of the norbornene derivative (for example, by increasing the molecular weight of the side chain or by allowing it to have a bicyclic structure). Furthermore, the glass transition temperature of a layer can be adjusted also by blending two kinds of resins having different glass transition temperatures that are obtained by ring-opening metathesis polymerization of a norbornene derivative and subsequent hydrogenation of the resulting polymerization product. Meanwhile, the glass transition temperature can be lowered by adding a polyethylene-based resin and/or a polypropylene-based resin.

Further, in cases where the use of the film is expanded to an application where there is a stringent requirement particularly for the dimensional stability in processing, it is preferred that the glass transition temperature of the layer B (TgB) be 115° C. to 170° C. and higher than that of the layer A. By controlling the glass transition temperature of the layer B in the above-described range, dimensional change during processing can be better inhibited without impairing the formability, which is preferred. From the standpoints of the formability and dimensional stability, the glass transition temperature of the layer B is more preferably 120° C. to 155° C., most preferably 125° C. to 145° C. Here, in cases where the layer B has a plurality of glass transition temperatures, the highest one is adopted as the glass transition temperature of the layer B.

In order to control the glass transition temperature of the layer B to be 115° C. to 170° C. and higher than that of the layer A at the same time, for example, in cases where a copolymer of norbornene and ethylene is used as the cyclic olefin-based resin, since the glass transition temperature can be elevated by increasing the norbornene content, a method in which the norbornene content of the cyclic olefin-based resin used in the layer B is increased to be higher than that of the cyclic olefin-based resin used in the layer A can be employed. In addition, in cases where a resin obtained by ring-opening metathesis polymerization of a norbornene derivative and subsequent hydrogenation of the resulting polymerization product is used as the cyclic olefin-based resin, the glass transition temperature can be elevated by increasing the molecular weight of the norbornene derivative (for example, by increasing the molecular weight of the side chain or by allowing it to have a bicyclic structure); therefore, a method of increasing the molecular weight of the norbornene derivative used for preparing the cyclic olefin-based resin of the layer B can also be employed. Moreover, since the glass transition temperature can be lowered by adding a polyethylene-based resin and/or a polypropylene-based resin, a method of incorporating a polyethylene-based resin and/or a polypropylene-based resin into the layer A can also be preferably employed.

In the film for forming of the present invention, in order to broaden the conditions applicable in the processing steps and improve the process stability, it is preferred that a temperature at which the storage modulus is 1,000 MPa (T1: ° C.) and a temperature at which the storage modulus is 100 MPa (T2: ° C.) satisfy the following formula (I):

$$T2-T1 \geq 10 \qquad (I)$$

In the present invention, "T1 (° C.)" is a temperature at which the average of the storage modulus t1 (MPa) in an arbitrary direction of the film and the storage modulus t2 (MPa) in the direction perpendicular to the arbitrary direction (that is, (t1+t2)/2) becomes 1,000 MPa. Further, "T2 (° C.)" is a temperature at which the average of the storage modulus t3 (MPa) in an arbitrary direction of the film and the storage modulus t4 (MPa) in the direction perpendicular to the arbitrary direction (that is, (t3+t4)/2) becomes 100 MPa.

Moreover, when the formula (I) is satisfied, since the difference between the temperature (T1: ° C.) at which the storage modulus is 1,000 MPa and extremely high dimensional stability can thus be attained and the temperature (T2: ° C.) at which the storage modulus is 100 MPa and the dimensional stability is reduced (T2−T1) is 10° C. or greater, the conditions applicable in the processing steps can be broadened, so that the film can be very easily processed. By setting the drying temperature after coating and printing to be higher, the line speed of the drying step can be increased and there is thus an advantage that the processing cost can be reduced. Accordingly, it is preferred that the drying temperature be set as high as possible; however, when the formula (I) is not satisfied, for example, even if the drying temperature is set at T1 where the storage modulus is 1,000 MPa, non-uniform drying temperature may cause an increase in the temperature to a level higher than T1 as well as a rapid reduction in the storage modulus, which may consequently reduce the dimensional stability and cause wrinkles and contraction of the film. On the other hand, by satisfying the formula (I), even if the drying temperature is set at T1 where the storage modulus is 1,000 MPa and the drying temperature becomes non-uniform, there is still a difference of 10° C. or greater until the temperature reaches T2 where the storage modulus is 100 MPa and the dimensional stability is reduced; therefore, a rapid reduction in the dimensional stability and generation of wrinkles and contraction can be inhibited.

From the standpoint of the formability, the upper limit of the value of T2−T1 is preferably 50° C., more preferably 40° C., most preferably 30° C.

In order to further improve the process stability, it is preferred that the following formula (I') be satisfied, and exceptionally high process stability can be preferably achieved by satisfying the following formula (I").

$$T2-T1 \geq 12 \qquad (I')$$

$$T2-T1 \geq 15 \qquad (I'')$$

In the film for forming of the present invention, as a method of satisfying the formula (I), for example, the film for forming of the present invention is allowed to have a constitution of a laminated film in which a cyclic olefin layer (layer B) comprising a cyclic olefin-based resin as a main component is laminated on at least one side of a cyclic olefin layer (layer A) comprising a cyclic olefin-based resin as a main component, wherein the glass transition temperature of the layer A (TgA: ° C.) and that of the layer B (TgB: ° C.) are controlled to satisfy preferably the following formula (II), more preferably the formula (IP), most preferably the formula (II").

$$TgB-TgA \geq 5 \qquad (II)$$

$$TgB-TgA \geq 7 \qquad (II')$$

$$TgB-TgA \geq 10 \qquad (II'')$$

The method of controlling the glass transition temperatures of the respective layers (TgA and TgB) is not particularly restricted and, as described in the above, in cases where a copolymer of norbornene and ethylene is used as the cyclic olefin-based resin, for example, a method of adjusting the norbornene content or a method of blending two kinds of cyclic olefin-based resins having different norbornene contents can be employed. Further, in cases where a resin obtained by ring-opening metathesis polymerization of a norbornene derivative and subsequent hydrogenation is used as the cyclic olefin-based resin, for example, a method of increasing the molecular weight of the norbornene derivative, a method of blending two kinds of resins having different glass transition temperatures that are obtained by ring-opening metathesis polymerization of a norbornene derivative and subsequent hydrogenation, or a method of adding a polyethylene-based resin and/or a polypropylene-based resin can be employed.

From the standpoint of the film-forming property, the upper limit of the value of TgB-TgA is preferably 100° C., more preferably 80° C., most preferably 50° C.

Further, it is preferred that the thickness ratio of the above-described layers A and B (total thickness of layer B/total thickness of layer A) be 0.1 to 2. By using a constitution of a laminated film in which a cyclic olefin layer (layer B) comprising a cyclic olefin-based resin as a main component is laminated on at least one side of a cyclic olefin layer (layer A) comprising a cyclic olefin-based resin as a main component, wherein the glass transition temperatures of the respective layers are controlled to satisfy the formula (II) and the thickness ratio (total thickness of layer B/total thickness of layer A) is controlled to be 0.1 to 2, the formula (I) can be achieved with good accuracy, which is very preferred.

In the film for forming of the present invention, from the standpoint of obtaining a forming member (a member of a decorated product) having good appearance of surfaces when the film is decorated, it is preferred that one surface of the film (surface X) have a surface roughness (SRa) of 2 nm to less than 50 nm and the other surface (surface Y) have a surface roughness (SRa) of 50 nm to 1,000 nm. It is particularly preferred that a surface of the film which is suitable as a surface to be decorated have a surface roughness (SRa) of 2 nm to less than 50 nm. It is noted here that the surface having a roughness (SRa) of 2 nm to less than 50 nm is hereinafter referred to as "surface X". When the SRa is 50 nm or greater, since the smoothness of the decorated surface of the film is poor, the surface appearance of the resulting forming member is impaired. From the standpoint of the appearance of the decorated surface, the lower limit of the SRa is preferably as small as possible; however, it is not less than 2 urn since such a film can be produced industrially with good yield. The surface roughness (SRa) of the surface X is in the range of preferably 2 to 20 nm, more preferably 5 to 10 nm.

Further, in the film for forming of the present invention, from the standpoints of the processability of the decorated film and the surface appearance of the resulting forming member, it is preferred that the surface opposite to the surface X that is suitable for decoration (hereinafter, referred to as "surface Y") have a surface roughness (SRa) of 50 nm to 1,000 nm. When the surface roughness (SRa) of the surface Y exceeds 1,000 nm, the decoration layer formed on the surface X is affected by the surface profile of the surface Y, so that the surface appearance of the resulting forming member is deteriorated. Meanwhile, when the surface roughness (SRa) of the surface Y is less than 50 nm, since the smoothness of the forming film is impaired upon forming a decoration layer thereon, the film is wrinkled and/or broken, so that the yield and the productivity are deteriorated. The surface roughness (SRa) of the surface Y is in the range of preferably 100 nm to 1,000 nm, more preferably 100 nm to 500 nm.

In the film for forming of the present invention, from the same standpoints as described above, it is preferred that one surface of the film (surface X) have a surface roughness (SRmax) of 20 nm to less than 500 nm and the other surface (surface Y) have a surface roughness (SRmax) of 500 nm to 10,000 nm. It is more preferred that the surface X have a surface roughness (SRmax) of 20 nm to 200 nm and the surface Y have a surface roughness (SRmax) of 1,000 nm to 5,000 nm.

In the film for forming of the present invention, in order to control the surface X to have a surface roughness (SRa) in the range of 2 nm to less than 50 nm or a surface roughness (SRmax) in the range of 20 nm to less than 500 nm, for example, a method of cooling and solidifying a sheet-form molten polymer extruded from a T-die using a casting roll having a smooth surface can be employed. The smooth surface of the casting roll is transferred onto the casted film and the surface smoothness of the resulting film is improved on the casting roll-contacting surface side.

In the above-described method, the arithmetic average roughness (Ra) of the casting roll surface (which is measured in accordance with JIS B-0601-2001) is preferably 50 nm or less, more preferably 40 nm or less, still more preferably 20 nm or less. Further, the lower limit of the arithmetic average roughness (Ra) of the casting roll is not particularly restricted; however, considering the ease of rolling up the film, the arithmetic average roughness (Ra) of the casting roll is preferably not less than 2 nm.

A casting roll having a desired surface roughness can be obtained by grinding the casting roll surface using a method appropriately selected from known grinding methods; however, in order to control the surface property more accurately, it is preferred to perform a buffing step after the grinding. Examples of a method for measuring the surface roughness of a casting roll include a method in which a replica sample is prepared by press-adhering and drying triacetyl cellulose or the like dissolved in an organic solvent onto the surface of a roll and subsequently transferring the surface profile of the roll onto a film, and the surface roughness of the thus obtained replica sample is then measured; and a method in which the roll surface is directly measured using a surface roughness meter.

Further, as a method of improving the surface smoothness by more strongly transferring the smoothness of the casting roll onto the film, for example, a method in which a film is tightly adhered onto a casting roll by electrostatic casting using a wire electrode, a method in which a film is tightly adhered onto a roll by blowing air thereto using an air-knife or an air chamber, or a method in which a sheet-form molten polymer extruded from a T-die is nipped with a pair of cooling rolls consisting of a casting roll and a nip roll and the sheet-form polymer is then drawn out with being tightly adhered onto the casting roll, can be employed.

Meanwhile, examples of a method of controlling the surface Y to have a surface roughness (SRa) in the range of 50 nm to 1,000 nm or a surface roughness (SRmax) in the range of 500 nm to 10,000 nm include a method in which a film is made to have a laminated constitution and the surface thereof is roughened by adding particles to a layer on the surface Y side; a method in which the surface of a film is roughened by crystallizing a polymer at the time of forming the film on a casting roll; and a method in which a sheet-form molten polymer extruded from a T-die is nipped with a pair of cooling rolls consisting of a casting roll and a nip roll and the sheet-form polymer is then drawn out with being tightly adhered onto the casting roll, wherein the surface of the nip roll is processed in advance to have an appropriate roughness and transferred to the film surface. However, from the standpoint of the controllability of the film surface roughness, it is preferred to employ a method in which a sheet-form molten polymer extruded from a T-die is nipped with a pair of cooling rolls consisting of a casting roll and a nip roll and the sheet-form polymer is then drawn out with being tightly adhered onto the casting roll, wherein the surface of the nip roll is processed in advance to have an appropriate roughness and transferred to the film surface. In the film production, the materials used for the casting roll and the nip roll are not particularly restricted; however, a metal material is preferred when it is desired to form a smooth surface and a rubber material is preferred when it is desired to roughen the surface so as to improve the ease of rolling up the film.

Further, in the film for forming of the present invention, it is preferred that a layer having the surface Y contain particles in an amount of greater than 0% by mass to 1.0% by mass, taking the total amount of all components of the layer having the surface Y as 100% by mass. When the amount of the particles contained in the layer having the surface Y is 1.0% by mass or less, the effect of the surface profile of the surface Y on a decoration layer formed on the surface X is suppressed and the surface appearance of the resulting forming member can often be further improved, which is preferred. Taking the total amount of all components of the layer having the surface Y as 100% by mass, the amount of the particles contained in the layer having the surface Y is more preferably greater than 0% by mass to 0.5% by mass, still more preferably greater than 0% by mass to 0.3% by mass.

The particle to be contained in the layer having the surface Y is not particularly restricted as long as it is inert against the resin constituting the layer having the surface Y. Examples of such particle include inorganic particles, organic particles and cross-linked polymeric particles, and two or more kinds of these particles may be added in combination. The type of inorganic particle is not particularly restricted and examples of usable inorganic particle include carbonates such as calcium carbonate, magnesium carbonate and barium carbonate; sulfates such as calcium sulfate and barium sulfate; complex oxides such as kaolin and talc; phosphates such as lithium phosphate, calcium phosphate and magnesium phosphate; oxides such as aluminum oxide, silicon dioxide and titanium oxide; and various salts such as lithium fluoride.

Further, as an organic particle, a terephthalate of calcium, barium, zinc, manganese, magnesium or the like is used.

Examples of cross-linked polymeric particle include those of a homopolymer or a copolymer produced from a vinyl-based monomer such as divinylbenzene, styrene, acrylic acid or methacrylic acid. In addition, an organic particle of polytetrafluoroethylene, benzoguanamine resin, thermosetting epoxy resin, unsaturated polyester resin, thermosetting urea resin, thermosetting phenol resin or the like is also preferably used.

From the standpoints of the quality and the appearance of surfaces, it is preferred that the film for forming of the present invention contain an antioxidizing agent and/or a metal salt of a fatty acid in an amount of 0.005% by mass to 0.5% by mass with respect to 100% by mass of all components contained in the film. In order to improve the quality of the film, by incorporating a polyethylene-based resin and/or a polypropylene-based resin, not only the shearing stress in the extrusion step can be reduced and generation of specks caused by formation of bridged structures can be inhibited, but also the toughness can be improved; however, wavy irregularities become more likely to be generated on the surface. Therefore, in order to expand the use of the film for forming of the present invention to those applications where there is a stringent requirement particularly for the film quality and the appearance of surfaces, it is preferred that an antioxidizing agent and/or a metal salt of a fatty acid be incorporated in an amount of 0.005% by mass to 0.5% by mass with respect to 100% by mass of all components contained in the film. By incorporating an antioxidizing agent and/or a metal salt of a fatty acid in an amount of 0.005% by mass to 0.5% by mass, in the same manner as in the case of incorporating a polyethylene-based resin and/or a polypropylene-based resin, generation of specks caused by formation of bridged structures can be inhibited. Consequently, the film for forming of the present invention is provided with an improved appearance of surfaces and a forming member obtained by forming the film can also attain excellent appearance of surfaces.

In cases where the film for forming of the present invention contains both an antioxidizing agent and a metal salt of a fatty acid, the total amount thereof is important. Specifically, it is preferred that the total amount of the antioxidizing agent and the metal salt of a fatty acid be 0.005% by mass to 0.5% by mass with respect to 100% by mass of all components contained in the film.

Here, the antioxidizing agent is not particularly restricted and, for example, a phosphite-based antioxidizing agent, an organic sulfur-based antioxidizing agent or a hindered phenol-based antioxidizing agent can be preferably used.

Examples of the phosphite-based antioxidizing agent include ones that contain phosphite in the chemical structural formula, more specifically, IRGAFOS 38, IRGAFOS P-EPQ and IRGAFOS 126 (all of which are manufactured by Ciba Specialty Chemicals K.K.); SUMILIZER TNP, SUMILIZER TPP-P and SUMILIZER P-16 (all of which are manufactured by Sumitomo Chemical Co., Ltd.); and ADK STAB PEP-4C, ADK STAB PEP-8, ADK STAB 11C, ADK STAB PEP-36, ADK STAB HP-11, ADK STAB 260, ADK STAB 522A, ADK STAB 329K, ADK STAB 1500, ADK STAB C, ADK STAB 135A and ADK STAB 3010 (all of which are manufactured by ADEKA Corporation).

Examples of the organic sulfur-based antioxidizing agent include ones that contain thioether in the chemical structural formula, more specifically, as commercially-available products, IRGANOX PS800FL and IRGANOX PS802FL (both of which are manufactured by Ciba Specialty Chemicals K.K.); SUMILIZER TP-M, SUMILIZER TP-D, SUMILIZER TL and SUMILIZER MB (all of which are manufactured by Sumitomo Chemical Co., Ltd.); and ADK STAB AO-23 (manufactured by ADEKA Corporation).

Examples of the hindered phenol-based antioxidizing agent include ones that contain 2,6-alkylphenol in the chemical structural formula, more specifically, as commercially-available products, IRGANOX 245, IRGANOX 259, IRGANOX 565, IRGANOX 1010, IRGANOX 1035, IRGANOX 1076, IRGANOX 1098, IRGANOX 1222, IRGANOX 1330, IRGANOX 1425, IRGANOX 3114, IRGANOX 1520, IRGANOX 1135, IRGANOX 1141 and IRGANOX HP2251 (all of which are manufactured by Ciba Specialty Chemicals K.K.); SUMILIZER BHT, SUMILIZER MDP-S, SUMILIZER GA-80, SUMILIZER BBM-S, SUMILIZER WX-R, SUMILIZER GM and SUMILIZER GS (all of which are manufactured by Sumitomo Chemical Co., Ltd.); and ADK STAB AO-30 (manufactured by ADEKA Corporation).

These antioxidizing agents may be used individually, or two or more thereof may be used in combination.

Further, specific examples of a metal salt of a fatty acid that may be used include acetates such as sodium acetate, potassium acetate, magnesium acetate and calcium acetate; laurates such as sodium laurate, potassium laurate, potassium hydrogen laurate, magnesium laurate, calcium laurate, zinc laurate and silver laurate; myristates such as lithium myristate, sodium myristate, potassium hydrogen myristate, magnesium myristate, calcium myristate, zinc myristate and silver myristate; palmitates such as lithium palmitate, potassium palmitate, magnesium palmitate, calcium palmitate, zinc palmitate, copper palmitate, lead palmitate, thallium palmitate and cobalt palmitate; oleates such as sodium oleate, potassium oleate, magnesium oleate, calcium oleate, zinc oleate, lead oleate, thallium oleate, copper oleate and nickel oleate; stearates such as sodium stearate, lithium stearate, magnesium stearate, calcium stearate, barium stearate, aluminum stearate, thallium stearate, lead stearate, nickel stearate and beryllium stearate; isostearates such as sodium isostearate, potassium isostearate, magnesium isostearate, calcium isostearate, barium isostearate, aluminum isostearate, zinc isostearate and nickel isostearate; behenates such as sodium behenate, potassium behenate, magnesium behenate, calcium behenate, barium behenate, aluminum behenate, zinc behenate and nickel behenate; and montanates such as sodium montanate, potassium montanate, magnesium montanate, calcium montanate, barium montanate, aluminum montanate, zinc montanate and nickel montanate. These fatty acid metal salts may be used individually, or two or more thereof may be used in combination in the form of a mixture. Thereamong, stearates and montanates can be suitably used and, for example, sodium stearate, calcium stearate, potassium stearate, zinc stearate, barium stearate and sodium montanate can be particularly suitably used.

In cases where the film for forming of the present invention is a laminated film having two or more of layer A(s) and layer B(s), the antioxidizing agent and/or the metal salt of a fatty acid preferably exhibit their effects even when they are contained in either of the layer A and the layer B; however, in particular, it is much preferred from the standpoint of the quality and appearance of surfaces that the antioxidizing agent and/or the metal salt of a fatty acid be contained in the layer B.

From the standpoint of the formability, it is preferred that the film for forming of the present invention have a tensile elongation at break of not less than 300% at 160° C. in at least one direction. The film for forming of the present invention can be formed by a variety of forming methods such as vacuum forming, pressure forming, vacuum-pressure forming and press forming; however, in order to address the problem of deep-drawing shape, it is preferred that the tensile elongation at break be not less than 300% at the forming temperature. In order to shorten the forming tact time as much as possible while maintaining the dimensional stability during processings such as coating, printing and vapor deposition, the forming temperature is preferably 160° C. or lower; therefore, the tensile elongation at break is preferably not less than 300% at 160° C. From the standpoints of the formability and dimensional stability, the tensile elongation at break at 160° C. in at least one direction of the film is more preferably not less than 500%, still more preferably not less than 800%. Further, in cases where the use of the film is expanded to an application where deep-drawing formability is required, it is particularly preferred that the tensile elongation at break at 160° C. be not less than 1,000% in at least one direction. From the standpoint of the formability, a higher tensile elongation at break at 160° C. is more preferred; however, considering the dimensional stability, it is preferably not higher than 2,000%.

The method of controlling the tensile elongation at break at 160° C. to be not less than 500% in at least one direction is not particularly restricted; however, it is preferred that the total thickness of layers having a glass transition temperature of 150° C. or lower be not less than 50%, taking the total thickness of the film as 100%. Further, taking the total thickness of the film as 100%, it is more preferred that the total thickness of layers having a glass transition temperature of 145° C. or lower be not less than 50% and it is most preferred that the total thickness of layers having a glass transition temperature of 140° C. or lower be not less than 50%. Here, in cases where there are plural glass transition temperatures such as a case where a plurality of resins are mixed in one layer, the highest one is defined as the glass transition temperature of the layer.

From the standpoints of the production stability, formability and dimensional stability, the film for forming of the present invention has a thickness of preferably 20 to 500 µm, more preferably 50 to 400 µm, particularly preferably 70 to 300 µm.

From the standpoints of the formability and processability, it is preferred that the film for forming of the present invention have a thickness variation of not greater than 10%. By controlling the thickness variation at not greater than 10%, the film can be formed uniformly and variations that are generated during processings such as coating, lamination, printing and vapor deposition can be inhibited, which are preferred. The method of controlling the film for forming of the present invention to have a thickness variation of not greater than 10% is not particularly restricted, and examples thereof include a method in which the casting temperature is increased to such an extent which does not cause adhesion; a method in which a film is casted at a position off-aligned from the top of a casting roll in the direction of the rotation of the casting roll; and a method in which the die clearance is reduced. The thickness variation is more preferably not greater than 8%, most preferably not greater than 5%.

Further, the film for forming of the present invention (in the case of a laminated film, the respective layers constituting the laminated film) may also contain, as required, an appropriate amount of a flame retardant, a heat stabilizer, an antioxidizing agent, an ultraviolet absorber, an antistatic agent, a plasticizer, an adhesion-imparting agent, an antifoaming agent such as polysiloxane and/or a coloring agent such as a pigment or a dye.

Since the film for forming of the present invention comprises a cyclic olefin-based resin as a main component, it has excellent appearance of surfaces and forming release property; therefore, among forming applications, the film for forming of the present invention can be preferably used in forming release applications and forming transfer foil applications.

Examples of the forming release applications include forming release films that are used in a heat-press forming step in the production of FPC (Flexible Printed Circuit). For example, when adhering a reinforcing laminate film onto the surface of a circuit board having surface irregularities by heat-pressing, the film for forming of the present invention can be applied as a forming release film which is arranged between a press die and the laminate film (this yields a constitution of press die/the film for forming of the present invention/laminate film/circuit board) so as to prevent the die and the laminate film from fusing with each other.

Further, examples of the forming transfer foil applications include the following:

an application where a decoration layer is laminated onto the film for forming of the present invention and then transferred onto a member simultaneously with forming, followed by detachment of the film for forming of the present invention, thereby obtaining a decorated member; and an application where a functional layer (for example, an anti-weathering layer, a scratch-resistant layer, a conductive layer, a heat ray-absorbing layer or a heat ray-reflecting layer) is laminated onto the film for forming of the present invention and then transferred onto a member simultaneously with forming, followed by detachment of the film for forming of the present invention, thereby obtaining a functional member.

Since the film for forming of the present invention has excellent detachability from a die, laminate film, a decoration layer and a functional layer, a forming member having excellent appearance of surfaces can be obtained.

It is preferred that the film for forming of the present invention be used in an forming transfer foil application. In order to prevent spontaneous detachment between the film and a coating film laminated thereon during forming, at least one side of the film has a surface free energy of preferably 33 mN to 45 mN/m, more preferably 35 mN to 40 mN/m. In order to control the surface free energy of the film for forming of the present invention to be in the above-described range, a variety of modification treatments such as corona discharge treatment, UV irradiation treatment, plasma treatment, laser treatment, flame treatment, high-frequency wave treatment, glow discharge treatment and ozone oxidation treatment can be employed and, from the cost and simplicity standpoints, a corona discharge treatment is preferably performed. The corona discharge treatment may be performed in the air, nitrogen, carbon dioxide or a mixture thereof. As for a method of measuring the film surface free energy, using four kinds of measurement liquids (water, ethylene glycol, formamide and methylene iodide) and a contact angle meter CA-D (manufactured by Kyowa Interface Science Co., Ltd.), the static contact angle of each liquid against the film surface is determined. Then, the thus obtained contact angle values and the values of the respective surface tension components are substituted into the following equation for each measurement liquid and the resulting 4-equation simultaneous system is solved for γSd, γSp and γSh, thereby the film surface free energy can be determined.

$$(\gamma Sd \cdot \gamma Ld)^{1/2} + (\gamma Sp \cdot \gamma Lp)^{1/2} + (\gamma Sh \cdot \gamma Lh)^{1/2} = \gamma L(1+\cos\theta)/2$$

wherein, $\gamma S = \gamma Sd + \gamma Sp + \gamma Sh$ and $\gamma L = \gamma Ld + \gamma Lp + \gamma Lh$ The symbols γS, γSd, γSp and γSh represent the surface free energy, dispersion force component, polar force component and hydrogen bonding component of the film, respectively, and γL, γLd, γLp and γLh represent the surface free energy, dispersion force component, polar force component and hydrogen bonding component of each of the measurement liquids that were used, respectively. It is noted that the surface tension values of the respective liquids used here are those that were proposed by Panzer (J. Panzer, J. Colloid. Interface Sci., 44, 142 (1973)).

The constitution of the forming transfer foil using the film for forming of the present invention is not particularly restricted; however, it is preferred that the forming transfer foil has a constitution in which a decoration layer is laminated on the film for forming of the present invention. It is noted here that the decoration layer is a layer for adding a decoration of a color, a pattern, a wood-effect, a metallic appearance, a pearly appearance or the like. From the standpoints of the scratch resistance, weathering resistance and design property of the forming member after transferring (adherend), it is preferred that a clear coated layer be further laminated. In this case, the clear coated layer is preferably laminated on the side of the film for forming. Further, from the standpoint of the adhesion between the forming member after transferring (adherend) and the decoration layer, it is preferred that an adhesion layer be also laminated. In this case, the adhesion layer is preferably laminated on the side of the adherend.

That is, it is preferred that the forming transfer foil of the present invention have a constitution in which a clear coated layer, a decoration layer and an adhesion layer are sequentially laminated on at least one side of the film for forming of the present invention.

The term "clear coated layer" used herein refers to a high-gloss and high-transparency layer which is arranged as the outermost layer of a forming member for the purpose of improving the outer appearance the forming member.

Further, the term "decoration layer" used herein refers to a layer arranged for the purpose of adding a decoration of a color, irregularities, a pattern, a wood-effect, a metallic appearance, a pearly appearance or the like.

Here, the resin used as the clear coated layer is not particularly restricted as long as it is a highly transparent resin. For example, a polyester-based resin, a polyolefin-based resin, an acrylic resin, a urethane-based resin, a fluorine-based resin, a polyvinyl acetate-based resin, a vinyl chloride-vinyl acetate copolymer-based resin or an ethylene-vinyl acetate copolymer-based resin copolymer is preferably used. From the standpoint of the scratch resistance, a thermosetting resin, an ultraviolet-curing resin or a heat radiation-curing resin is also preferably used. Further, in order to improve the weathering resistance, an ultraviolet absorber and/or an ultraviolet-reflecting agent may also be added to the clear coated layer.

Further, from the standpoints of the damage resistance and design property, the clear coated layer has a thickness of preferably 10 to 100 µm, more preferably 15 to 80 µm, most preferably 20 to 60 µm.

Examples of a method of forming such a clear coated layer include a method by which a clear coated layer is directly formed and a method in which a clear coated layer is once formed on a carrier film and then transferred. In cases where the thus formed clear coated layer is required to be dried at a high temperature, it is preferred to employ a method in which a clear coated layer is once formed on a carrier film and then transferred. As the method of forming a clear coated layer, in addition to a roller coating method, a brush coating method, a spray coating method and an dip coating method, for example, a method using a gravure coater, a die coater, a comma coater, a bar coater or a knife coater may be employed. Further, since the film for forming of the present invention contains a cyclic olefin-based resin as a main component, the film has poor resistance against aromatic solvents such as toluene and xylene; therefore, a constitution in which an aromatic solvent is not used as a solvent in the formation of clear coated layer is preferred.

The method of forming a decoration layer is not particularly restricted and a decoration layer can be formed by, for example, coating, printing or metal-vapor deposition. When a decoration layer is formed by coating, a coating method such as gravure coating, roll coating or comma coating can be employed. Further, when a decoration layer is formed by printing, a printing method such as offset printing, gravure printing or screen printing can be employed. As the resin used in this process, for example, a polyester-based resin, a polyolefin-based resin, an acrylic resin, a urethane-based resin, a fluorine-based resin, a polyvinyl acetate-based resin, a vinyl chloride-vinyl acetate copolymer-based resin or an ethylene-vinyl acetate copolymer-based copolymer resin is preferably used. The coloring agent to be used is not particularly restricted; however, taking into consideration the dispersion property and the like, the coloring agent is appropriately selected from dyes, inorganic pigments, organic pigments and the like.

From the standpoints of the post-forming color retention and design property, the decoration layer formed by coating or printing has a thickness of preferably 10 to 100 µm, more preferably 15 to 80 µm, most preferably 20 to 60 µm.

Further, in cases where a decoration layer is formed by metal-vapor deposition, the method of preparing a thin film to be deposited is not particularly restricted and, for example, a vacuum deposition method, an EB deposition method, a sputtering method or an ion-plating method can be employed. Here, in order to improve the adhesion between a polyester film and the deposited layer, it is desired that the surface on which the deposition is made be pretreated in advance by, for example, a corona discharge treatment or coating with an anchor coating agent. As a metal used for the metal-vapor deposition, from the standpoint of the shape-followability, a metal compound having a melting point of 150° C. to 400° C. is preferably used. By using such a metal having a melting point in this range, the deposited metal layer can also be formed in a temperature range where the film for forming of the present invention can be formed, so that generation of a defect in the deposited layer caused by the forming is more likely to be inhibited, which is preferred. The melting point of the metal compound is more preferably 150° C. to 300° C. The metal compound having a melting point of 150° C. to 400° C. is not particularly restricted; however, indium (157° C.) and tin (232° C.) are preferred and indium can be particularly preferably used. The thickness of the laminated decoration layer is preferably 0.001 to 100 μm, more preferably 0.01 to 80 μm, most preferably 0.02 to 60 μm.

As the material of an adhesion layer arranged for the purpose of imparting a formed resin with adhesiveness, a heat sensitive-type or pressure sensitive-type material can be used. In cases where the adhesion layer is transferred onto an injection-formed resin or a resin formed article, the adhesion layer can be designed in accordance with the resin. When the resin is an acrylic resin, an acrylic resin is preferably used as the material of the adhesion layer and, when the resin is a polyphenylene oxide-polystyrene-based resin, a polycarbonate-based resin, a styrene copolymer-based resin or a polystyrene-based resin, for example, a resin having an affinity thereto, such as an acrylic resin, a polystyrene-based resin or a polyamide-based resin, is preferably used. When the formed resin is a polypropylene-based resin, it is preferred to use a chlorinated polyolefin-based resin, a chlorinated ethylene-vinyl acetate copolymer-based resin, a cyclized rubber or a coumarone-indene-based resin.

As a method of forming such an adhesion layer, a variety of methods can be employed, and examples thereof include coating methods, such as roll coating, gravure coating and comma coating, and printing methods such as gravure printing and screen printing.

The adherend to be decorated with the forming transfer foil comprising the film for forming of the present invention is not particularly restricted and, for example, a resin such as polypropylene, acryl, polystyrene, polyacrylonitrile-styrene or polyacrylonitrile-butadiene-styrene, or a metal member can be used.

EXAMPLES

The present invention will now be described by way of examples thereof; however, the present invention is not restricted thereto by any means.
[Methods of Measuring Various Properties]
(1) Film Thickness and Layer Thickness In order to determine the total thickness of a laminated film, the thickness of a sample cut out from the film was measured at five arbitrary points using a dial gauge and the average thereof was calculated.

Further, in order to determine the thickness of each layer of a laminated film, using a metallographic microscope (Leica DMLM, manufactured by Leica Microsystems), a photograph of a cross-section of the film was taken at a magnification of ×100 by transmitting a light therethrough. Then, for each layer of the laminated film, the thickness was measured at five arbitrary points and the average thereof was defined as the thickness of the subject layer.
(2) Storage Modulus A film was cut out into a rectangle of 60 mm in length and 5 mm in width in an arbitrary direction and the direction perpendicular thereto to prepare a sample. Then, using a dynamic viscoelasticity measuring apparatus (RHEOSPECTRA DVE-V4 FT, manufactured by Rheology Co., Ltd.), the thus obtained sample was measured under the following conditions to determine the storage modulus (Et) in the following measurement temperature range.
Frequency: 10 Hz
Gauge length (chuck distance): 20 mm
Displacement amplitude: 10 μm
Measurement temperature range: 25° C. to 180° C.
Heating rate: 5° C./min Here, the temperature T1 (° C.) at which the storage modulus (E') is 1,000 MPa means a temperature at which an average of a storage modulus t1 in an arbitrary direction of the subject film and a storage modulus t2 in the direction perpendicular thereto (that is, (t1+t2)/2) becomes 1,000 MPa. Further, the temperature T2 (° C.) at which the storage modulus (E') is 100 MPa means a temperature at which an average of a storage modulus t3 in an arbitrary direction of the subject film and a storage modulus t4 in the direction perpendicular thereto (that is, (t3+t4)/2) becomes 100 MPa.
(3) Glass Transition Temperature Using a differential scanning calorimeter (RDC220, manufactured by SEIKO Instruments Inc.), the glass transition temperature was measured and analyzed in accordance of JIS K7121-1987 and JIS K7122-1987.

As a sample, 5 mg of a film was used (for evaluation of a specific layer of a film, 5 mg of the layer to be measured was scraped off to prepare a sample). The thus obtained sample was heated from 25° C. to 300° C. at a rate of 20° C./min and the change in the specific heat caused by transition from a glass state to a rubber state was measured. The glass transition temperature of the subject film was defined as the glass transition temperature determined at a midpoint of intersections between a straight line running parallel in the direction of the ordinate (the axis indicating the heat flux) to the straight line extending from each baseline and a curve of the part having stepwise glass transition. In cases where plural glass transition temperatures were found, the highest one was adopted as the glass transition temperature of the subject film.
(4) Tensile Elongation at Break A film was cut out into a rectangle of 100 mm in length and 10 mm in width in an arbitrary direction and the direction perpendicular thereto to prepare a sample. Then, using a tensile tester (TENSILON UCT-100, manufactured by Orientec Co., Ltd.), the thus obtained sample was subjected to a tensile test in each of the longitudinal and transverse directions at an initial tensile chuck distance of 20 mm and a tensile rate of 200 mm/min. The measurements were performed after preheating the film sample for 60 seconds in a thermostat bath whose temperature had been set at 160° C. in advance. The tensile elongation at break was defined as the elongation measured at the point when the sample was broken. It is noted here that a total of five measurements were performed for each sample in each direction and the average value thereof was used for evaluation.
(5) Thickness Variation A film was cut out at an arbitrary position into a size of 200 mm×300 mm to prepare a sample. The thickness of the thus obtained sample was measured at 11 points at 20-mm intervals from the edge in the direction of the 200-mm side and 11 points at 30-mm intervals in the direction of the 300-mm side, for a total of 121 points. The maximum, minimum and average values were determined to calculate the thickness variation using the following equation:

Thickness variation(%)={(Maximum Value−Minimum Value)/Average Value}×100

(6) Surface Roughness (SRa) and Surface Roughness (SRmax)

The surface roughnesses of the film, SRa and SRmax, were measured by a probe method using a three-dimensional surface roughness meter (ETB-30HK, manufactured by Kosaka Laboratory Ltd.) under the following conditions.

Probe tip radius: 2 μm
Probe weight; 10 mg
Measurement length: 1 mm
Pitch: 50 μm
Number of measurements: 40
Cut-off value: 0.25 mm Once the curvature of roughness, f(x,y), is obtained under the above-described conditions, the SRa is calculated by the following equation (1).

$$SRa = \int_0^{lx} \int_0^{ly} |f(x,y)| dxdy \quad \text{equation (1)}$$

(wherein, lx=measurement length=1 mm; and ly=(pitch)× (number of measurements)=2 mm)

The surface roughness, SRmax, is defined as a distance between two planes that are parallel to the mean plane and encompass the highest and the deepest points in the above-described measurement range.

(7) Roll Surface Roughness (Ra)

The roughness of the roll surface was measured using a surface roughness meter (SE1700, manufactured by Kosaka Laboratory Ltd.). The measurement was performed under the following conditions: probe tip radius=0.5 μm, measuring force=100 μN, measurement length=1 mm, lower cut-off=0.200 mm and higher cut-off=0.000 mm, and the arithmetic average roughness (Ra) was determined in accordance with JIS B-0601-2001.

(8) Quality

A film was cut out at an arbitrary position into a size of 200 mm×300 mm to prepare a sample. The thus obtained film sample was visually observed with light transmitting therethrough under a three-wavelength fluorescent lamp and the number of specks having a major axis of 100 μm or longer was counted to determine the number of specks per A4 size. The quality of the film was evaluated based on the following criteria.

A: The number of specks was less than 10.
B: The number of specks was 10 or more but less than 20.
C: The number of specks was 20 or more but less than 30.
D: The number of specks was 30 or more.

(9) Appearance of Surfaces

Using a film stretcher (KARO-IV, manufactured by Brückner Maschinenbau GmbH), a film was stretched under the following conditions. Then, the appearance of the surfaces of the thus stretched film was evaluated based on the following criteria.

Initial sample: 100 mm×100 mm
Preheating and stretching temperature: Tg of each film+20° C.
Preheating time: 20 seconds
Stretching rate: 20%/s
Stretching ratio: 2×2

A: The surface gloss was very high and no irregularity was observed at all.
B: The surface gloss was high and hardly any irregularity was observed.
C: The surfaces were observed to have some wavy irregularities; however, the extent thereof was not problematic from a practical standpoint.
D: Prominent wavy irregularities were observed on the surfaces.

(10) Coating Performance

A film was cut out at an arbitrary position into a size of 200 mm×300 mm to prepare a sample. Then, using an applicator, the surface of the thus obtained sample (in the case of a laminated film having layers A and B, the surface of the layer B side) was coated with UF-TCI-1 manufactured by Kyoeisha Chemical Co., Ltd. The coating performance was evaluated based on the following criteria.

A: No coating irregularity was generated and the coating performance was good.
B: Hardly any coating irregularity was generated and there was no problem in the coating performance.
C: Slight coating irregularities were generated; however, the extent thereof was not problematic from a practical standpoint.
D: Prominent coating irregularities were generated.

(11) Formability

A film was cut out at an arbitrary position into a size of 200 mm×300 mm to prepare a sample. Using an applicator, 892L manufactured by Nippon Chemical was coated onto the surface of the thus obtained sample (in the case of a laminated film having layers A and B, the surface of the layer A side) and then dried at 80° C. for 10 minutes to form an adhesion layer having a thickness of 20 μm. The thus obtained adhesion layer-laminated film was heated to a temperature of 120° C. using a far-infrared heater at 400° C. and then subjected to vacuum-pressure forming (pressure air: 0.2 Ma) along a polypropylene-made resin frame heated to 50° C. (bottom diameter: 150 mm), thereby obtaining a laminate of film/adhesion layer/polypropylene-made resin frame. For the thus obtained laminate, the condition of the film formed on the frame (drawing ratio: forming height/bottom diameter) was evaluated based on the following criteria. That is, the formability of the film was verified by using a plurality of frames having different drawing ratios and the highest value among the drawing ratios of the frames on which the film was formed was adopted and evaluated based on the following criteria.

In the following Examples, the surface temperatures of the respective adhesion layer-laminated films when they were formed were as follows.

145° C.: Examples 1, 2, 12 and 13, Comparative Examples 1, 3 and 5
155° C.: Examples 3, 4, 8 to 11, 14, 15 and 19 to 25
160° C.: Examples 5 to 7, 16 to 18, 26 to 28 and Comparative Examples 2 and 4

S: The film was formed at a drawing ratio of 1.0 or higher.
A: The film was formed at a drawing ratio of 0.9 to less than 1.0.
B: The film was formed at a drawing ratio of 0.8 to less than 0.9.
C: The film was formed at a drawing ratio of 0.7 to less than 0.8.
D: The shape-followability was poor and the film could not be formed at a drawing ratio of 0.7.

The evaluations of S to C are satisfactory.

(12) Dimensional Stability

A film was cut out into a rectangle of 50 mm in length and 4 mm in width in an arbitrary direction and the direction perpendicular thereto to prepare a sample. Then, using a thermomechanical analyzer (TMA EXSTAR6000, manufactured by SEIKO Instruments Inc.), the thus obtained sample was heated under the following conditions. In this heating process, the dimensional stability was evaluated in terms of the temperature at which the rate of dimensional change exceeded 1% in accordance with the following criteria.

Gauge length: 15 mm
Load: 19.6 mN
Heating rate: 5° C./min
Measuring temperature range: 25 to 220° C.
Rate of dimensional change (%)={|Gauge length (mm)–Length of retained film (mm)|/Gauge length (mm)}×100

S: 150° C. or higher
A: 145° C. to lower than 150° C.
B: 140° C. to lower than 145° C.
C: 130° C. to lower than 140° C.
D: lower than 130° C.

(13) Forming Release Property

A film was cut out at an arbitrary position into a size of 200 mm×300 mm to prepare a sample. Using an applicator, UF-TCI-1 manufactured by Kyoeisha Chemical Co., Ltd. was coated onto the surface of the thus obtained sample (in the case of a laminated film having layers A and B, the surface of the layer B side) and then dried at 80° C. for 10 minutes to form a clear coated layer having a thickness of 50 μm. Further, on this clear coated layer, an acryl/urethane-based silver ink was coated using an applicator and then dried at 80° C. for 10 minutes to form a decoration layer having a thickness 30 μm. Thereafter, using an applicator, 892L manufactured by Nippon Chemical was further coated onto the decoration layer and dried at 80° C. for 10 minutes to form an adhesion layer having a thickness of 20 μm, thereby obtaining a forming transfer foil.

The thus obtained forming transfer foil was subjected to vacuum-pressure forming in the same manner as in the above-described (11), thereby obtaining a laminate of film for forming/clear coated layer/decoration layer/adhesion layer/polypropylene-made resin frame. The thus obtained laminate was then irradiated with ultraviolet light at an irradiation intensity of 2,000 mJ/cm² to cure the coating agents. From the resulting laminate, a sample was cut out in an arbitrary direction into a rectangle of 100 mm in length and 10 mm in width. After partially detaching the film for forming and clear coated layer of the thus obtained sample, using a tensile tester (TENSILON UCT-100, manufactured by Orientec Co., Ltd.), the sample was pinched with a chuck on each of the film for forming side and the clear coated layer side (clear coated layer/decoration layer/adhesion layer/polypropylene-made resin frame) and then subjected to a 180° peeling test. The average load value at the time of peeling was determined and the forming release property was evaluated based on the criteria described below.

It is noted here that the peeing test was performed at an initial chuck distance of 100 mm, a tensile rate of 300 mm/min and a temperature of 25° C. in each of an arbitrary direction of the film and the direction perpendicular thereto. A total of five measurements were performed for each sample in each direction and the forming release property was evaluated in terms of the average value thereof.

A: 0 N/10 mm to less than 0.2 N/10 mm
B: 0.2 N/10 mm to less than 0.5 N/10 mm
C: 0.5 N/10 mm to less than 1 N/10 mm
D: 1 N/10 mm or higher

(14) Brittle Resistance

A film was cut out into a rectangle of 150 mm in length and 15 mm in width in an arbitrary direction and the direction perpendicular thereto to prepare a sample. Using a MIT fatigue resistance tester (manufactured by Toyo Seiki Seisaku-sho, Ltd.), the thus obtained sample was measured by a method in accordance with JIS P8115 (1994). The number of bendings that could be performed until the sample was broken (N: average value of a total of 10 measurements, 5 of which were performed in each direction) was evaluated based on the following criteria.

MIT chuck: R=2.0, t=0.25 mm, tension: 1.25 kg/mm²
Bending angle: 135±2°, Number of bendings: 175±10/minute A: The number of bendings until the sample was broken (N) was 10 or more.
B: The number of bendings until the sample was broken (N) was less than 10.

(15) Winding Property

For each film, a film roll of 400 mm in width and 200 m in length (a film roll wound on a core of 3 inch in diameter and 550 mm in width) was prepared. The thus obtained film roll was rolled out under the following conditions and then wound on a core of 3 inch in diameter and 550 mm in width.

Roll-out tension: 180 N/m
Winding tension: 120 N/m
Rate: 20 m/min

The appearance of the resulting roll was evaluated based on the following criteria.

A: No non-nuclear granular defect was observed and the resulting roll had excellent appearance.
B: The resulting roll was observed to have a non-nuclear granular defect(s) or the roll had poor appearance of surfaces (this evaluation includes a case where the resulting roll was observed to have a non-nuclear granular defect(s) and the roll also had poor appearance of surfaces).

(16) Process Stability

A film roll of 500 mm in width was rolled out and passed through a floating dryer having a pre-set temperature of T1 (a temperature at which the storage modulus is 1,000 MPa) and a furnace length of 2 m at a rate of 1 m/min. In this process, the film in the furnace was observed and evaluated based on the following criteria.

A: The film had no wrinkle or slackness.
B: The film was observed to be slightly wrinkled but there was no slackness.
C: Wrinkles were produced on the film but there was no slackness.
D: The film had slackness.

(17) Appearance of Surfaces of Formed Body

On the surface X side of a film roll, UF-TCI-1 manufactured by Kyoeisha Chemical Co., Ltd. was coated using a die coater and dried at 80° C. for 10 minutes to form a 50 μm-thick clear coated layer. Then, using the same die coater, an acryl/urethane-based silver ink was coated onto the clear coated layer and dried at 80° C. for 10 minutes to form a 30 μm-thick decoration layer. Further, on this decoration layer, 892L manufactured by Nippon Chemical was coated using an applicator and dried at 80° C. for 10 minutes to form a 20 μm-thick adhesion layer, thereby preparing a forming transfer foil roll.

From the thus obtained forming transfer foil roll, a film was cut out at an arbitrary position into a size of 200 mm×300 mm and then subjected to vacuum-pressure forming in the same manner as in the above-described (11), thereby obtaining a forming member having a constitution of film for forming/clear coated layer/decoration layer/adhesion layer/polypropylene-made resin frame. The thus obtained forming member was then irradiated with ultraviolet light at an irradiation intensity of 2,000 mJ/cm² to cure the coating agents. Thereafter, the film was detached and the part of the transfer body (clear coated layer/decoration layer/adhesion layer/polypropylene-made resin frame) from which the film was detached was observed under a three-wavelength fluorescent lamp from the side of the clear coated layer. The surface appearance was evaluated based on the following criteria.

A: The shape of the fluorescent lamp was clearly reflected on the surface.

B: The shape of the fluorescent lamp was reflected on the surface; however, there were some parts where the reflection was somewhat blur.

C: The shape of the reflected fluorescent lamp was entirely obscure.

[Materials]

(Cyclic Olefin-Based Resin A)

"TOPAS 8007F-04" manufactured by Polyplastics Co., Ltd. was used.

(Cyclic Olefin-Based Resin B)

"TOPAS 6013F-04" manufactured by Polyplastics Co., Ltd. was used.

(Cyclic Olefin-Based Resin C)

"TOPAS 6015S-04" manufactured by Polyplastics Co., Ltd. was used.

(Cyclic Olefin-Based Resin D)

"ZEONOR 1060R" manufactured by Zeon Corporation was used.

(Cyclic Olefin Resin E)

"ZEONOR 1430R" manufactured by Zeon Corporation was used.

(Cyclic Olefin Resin F)

"TOPAS 6017S-04" manufactured by Polyplastics Co., Ltd. was used.

(Polyethylene-Based Resin)

"EVOLUE SP2540" manufactured by Prime Polymer Co., Ltd. was used.

*In the tables below, this is indicated as "PE".

(Polypropylene-Based Resin)

"P204" manufactured by Prime Polymer Co., Ltd. was used.

*In the tables below, this is indicated as "PP".

(Metal Salt of Fatty Acid)

Zinc stearate manufactured by Nacalai Tesque was used.

(Antioxidizing Agent)

"IRGANOX 1010" manufactured by Ciba Specialty Chemicals K.K. was used.

Example 1

Resins were mixed in accordance with the composition and constitution shown in the table below. The resulting resin mixture was fed to a single screw extruder (L/D=30), melted at a feeding section temperature of 250° C. and subsequent temperature of 260° C., and then passed through a leaf disk filter having a filtration accuracy of 30 μm. Thereafter, the resultant was extruded from a T-die (die clearance: 0.4 mm) onto a mirror-finished drum having a controlled temperature of 100° C. (surface roughness: 0.2 s) in the form of a sheet. In this process, the resulting sheet was nipped with an elastic metal roll (nip pressure: 0.2 MPa) to obtain the film for forming of the present invention having a thickness of 100 μm.

Example 2

The film for forming of the present invention having a thickness of 100 μm was obtained in the same manner as in Example 1, except that the composition and constitution were changed as shown in the table below.

Example 3

The film for forming of the present invention having a thickness of 100 μm was obtained in the same manner as in Example 1, except that the composition and constitution were changed as shown in the table below.

Example 4

The film for forming of the present invention having a thickness of 100 μm was obtained in the same manner as in Example 1, except that the composition and constitution were changed as shown in the table below and the feeding section temperature, the subsequent temperature and the temperature of the mirror-finished drum were controlled at 260° C., 270° C. and 110° C., respectively.

Example 5

The film for forming of the present invention having a thickness of 100 μm was obtained in the same manner as in Example 4, except that the composition and constitution were changed as shown in the table below.

Example 6

The film for forming of the present invention having a thickness of 100 μm was obtained in the same manner as in Example 1, except that the composition and constitution were changed as shown in the table below and the feeding section temperature, the subsequent temperature and the temperature of the mirror-finished drum were controlled at 270° C., 280° C. and 120° C., respectively.

Example 7

The film for forming of the present invention having a thickness of 100 μm was obtained in the same manner as in Example 6, except that the composition and constitution were changed as shown in the table below.

Example 8

The film for forming of the present invention having a thickness of 100 μm was obtained in the same manner as in Example 1, except that the composition and constitution were changed as shown in the table below.

Example 9

The film for forming of the present invention having a thickness of 100 μm was obtained in the same manner as in Example 4, except that the composition and constitution were changed as shown in the table below.

Example 10

The film for forming of the present invention having a thickness of 100 μm was obtained in the same manner as in Example 4, except that the composition and constitution were changed as shown in the table below.

Example 11

The film for forming of the present invention having a thickness of 100 μm was obtained in the same manner as in Example 4, except that the composition and constitution were changed as shown in the table below.

Example 12

In accordance with the composition and constitution shown in the table below, resins were each fed to a single screw extruder (L/D=30), melted at a feeding section temperature of 250° C. and subsequent temperature of 260° C., and then passed through a leaf disk filter having a filtration accuracy of 30 μm. Thereafter, in a feed block arranged above a die, the resins were laminated such that a laminate of layer B/layer A/layer B (see the table below for the thickness ratio) was obtained, and the thus obtained laminate was subsequently extruded from a T-die (die clearance: 0.4 mm) onto a mirror-finished drum having a controlled temperature of 100° C. (surface roughness: 0.2 s) in the form of a sheet. In this process, the resulting sheet was nipped with an elastic metal roll (nip pressure: 0.2 MPa) to obtain the film for forming of the present invention having a thickness of 100 μm.

Example 13

The film for forming of the present invention having a thickness of 100 μm was obtained in the same manner as in Example 12, except that the composition and constitution were changed as shown in the table below.

Example 14

The film for forming of the present invention having a thickness of 100 μm was obtained in the same manner as in Example 12, except that the composition and constitution were changed as shown in the table below.

Example 15

The film for forming of the present invention having a thickness of 100 was obtained in the same manner as in Example 1, except that the composition and constitution were changed as shown in the table below and the feeding section temperature, the subsequent temperature and the temperature of the mirror-finished drum were controlled at 260° C., 270° C. and 110° C., respectively.

Example 16

The film for forming of the present invention having a thickness of 100 μm was obtained in the same manner as in Example 15, except that the composition and constitution were changed as shown in the table below.

Example 17

The film for forming of the present invention having a thickness of 100 μm was obtained in the same manner as in Example 15, except that the composition and constitution were changed as shown in the table below and the feeding section temperature of the layer B extruder, the subsequent temperature and the temperature of the mirror-finished drum were controlled at 270° C., 280° C. and 120° C., respectively.

Example 18

The film for forming of the present invention having a thickness of 100 μm was obtained in the same manner as in Example 17, except that the composition and constitution were changed as shown in the table below.

Example 19

The film for forming of the present invention having a thickness of 100 μm was obtained in the same manner as in Example 15, except that the composition and constitution were changed as shown in the table below.

Example 20

The film for forming of the present invention having a thickness of 100 μm was obtained in the same manner as in Example 15, except that the composition and constitution were changed as shown in the table below.

Example 21

The film for forming of the present invention having a thickness of 100 μm was obtained in the same manner as in Example 15, except that the composition and constitution were changed as shown in the table below.

Example 22

The film for forming of the present invention having a thickness of 100 μm was obtained in the same manner as in Example 15, except that the composition and constitution were changed as shown in the table below.

Example 23

In accordance with the composition and constitution shown in the table below, resins were each fed to a single screw extruder (L/D=30), melted at a feeding section temperature of 260° C. and subsequent temperature of 270° C., and then passed through a leaf disk filter having a filtration accuracy of 30 μm. Thereafter, in a feed block arranged above a die, the resins were laminated such that a laminate of layer B/layer A/layer B (see the table below for the thickness ratio) was obtained, and the thus obtained laminate was subsequently extruded from a T-die (die clearance: 1 mm) onto a mirror-finished drum having a controlled temperature of 100° C. (surface roughness: 0.2 s) in the form of a sheet. In this process, the resulting sheet was nipped with an elastic metal roll (nip pressure: 0.2 MPa) to obtain the film for forming of the present invention having a thickness of 100 μm.

Example 24

In accordance with the composition and constitution shown in the table below, resins were each fed to a single screw extruder (L/D=30), melted at a feeding section temperature of 260° C. and subsequent temperature of 270° C., and then passed through a leaf disk filter having a filtration accuracy of 30 μm. Thereafter, in a feed block arranged above a die, the resins were laminated such that a laminate of layer B/layer A/layer B (see the table below for the thickness ratio) was obtained, and the thus obtained laminate was subsequently extruded from a T-die (die clearance: 1 mm) onto a mirror-finished drum having a controlled temperature of 80° C. (surface roughness: 0.2 s) in the form of a sheet. In this process, the resulting sheet was nipped with an elastic metal roll (nip pressure: 0.2 MPa) to obtain the film for forming of the present invention having a thickness of 100 μm.

Example 25

In accordance with the composition and constitution shown in the table below, resins were each fed to a single screw extruder (L/D=30), melted at a feeding section temperature of 250° C. and subsequent temperature of 260° C., and then passed through a leaf disk filter having a filtration accuracy of 30 μm. Thereafter, in a feed block arranged above a die, the resins were laminated such that a laminate of layer B/layer A/layer B (see the table below for the thickness ratio) was obtained, and the thus obtained laminate was subsequently extruded from a T-die (die clearance: 1 mm) onto a mirror-finished drum having a controlled temperature of 40° C. (surface roughness: 0.2 s) in the form of a sheet. In this process, the resulting sheet was nipped with an elastic metal roll (nip pressure: 0.2 MPa) to obtain the film for forming of the present invention having a thickness of 100 μm.

Example 26

The film for forming of the present invention having a thickness of 100 μm was obtained in the same manner as in Example 17, except that the composition and constitution were changed as shown in the table below.

Example 27

The film for forming of the present invention having a thickness of 100 μm was obtained in the same manner as in Example 17, except that the composition and constitution were changed as shown in the table below.

Example 28

The film for forming of the present invention having a thickness of 100 was obtained in the same manner as in Example 17, except that the composition and constitution were changed as shown in the table below.

Comparative Example 1

The film for forming of the present invention having a thickness of 100 μm was obtained in the same manner as in Example 12, except that the composition and constitution were changed as shown in the table below.

Comparative Example 2

The film for forming of the present invention having a thickness of 100 μm was obtained in the same manner as in Example 6, except that the composition and constitution were changed as shown in the table below.

Comparative Example 3

The film for forming of the present invention having a thickness of 100 μm was obtained in the same manner as in Example 1, except that the composition and constitution were changed as shown in the table below.

Comparative Example 4

The film for forming of the present invention having a thickness of 100 μm was obtained in the same manner as in Example 17, except that the composition and constitution were changed as shown in the table below.

Comparative Example 5

The film for forming of the present invention having a thickness of 100 μm was obtained in the same manner as in Example 1, except that the composition and constitution were changed as shown in the table below.

Example 29

The film for forming of the present invention having a thickness of 100 μm was obtained in the same manner as in Example 16, except that an elastic metal roll (surface roughness: 0.2 s, Ra: 0.01 μm) was used.

Example 30

The film for forming of the present invention having a thickness of 100 μm was obtained in the same manner as in Example 16, except that a rubber roll (surface roughness: 0.8 s, Ra: 0.1 μm) was used in place of the elastic metal roll for nipping the sheet-form laminate extruded onto the mirror-finished drum (surface roughness: 0.2 s).

Example 31

The film for forming of the present invention having a thickness of 100 μm was obtained in the same manner as in Example 16, except that a rubber roll (surface roughness: 6.3 s, Ra: 0.6 μm) was used in place of the elastic metal roll for nipping the sheet-form laminate extruded onto the mirror-finished drum (surface roughness: 0.2 s).

Example 32

The film for forming of the present invention having a thickness of 100 μm was obtained in the same manner as in Example 16, except that a rubber roll (surface roughness: 18 s, Ra: 1.6 μm) was used in place of the elastic metal roll for nipping the sheet-form laminate extruded onto the mirror-finished drum (surface roughness: 0.2 s).

TABLE 1

|  |  | Example 1 | Example 2 | Example 3 |
|---|---|---|---|---|
| Constitution | Layer constitution | Layer A | Layer A | Layer A |
|  | Thickness (μm) | 100 | 100 | 100 |
|  | Thickness ratio (Layer B/Layer A) | — | — | — |
| Layer A | Composition (% by mass) | Cyclic olefin-based resin A (28% by mass) | Cyclic olefin-based resin D (38% by mass) | Cyclic olefin-based resin A (9% by mass) |
|  |  | Cyclic olefin-based resin B (67% by mass) | Cyclic olefin-based resin E (57% by mass) | Cyclic olefin-based resin B (86% by mass) |
|  |  | PE (5% by mass) | PE (5% by mass) | PE (5% by mass) |

TABLE 1-continued

|  |  | Example 1 | Example 2 | Example 3 |
|---|---|---|---|---|
| Layer B | Glass transition temperature (° C.) | 120 | 125 | 130 |
|  | Composition (% by mass) | — | — | — |
|  | Glass transition temperature (° C.) | — | — | — |
| Film composition | Cyclic olefin-based resin (% by mass) | 95% by mass | 95% by mass | 95% by mass |
|  | Metal salt of fatty acid (% by mass) | — | — | — |
|  | Antioxidizing agent (% by mass) | — | — | — |
| Film Properties | Storage modulus (MPa) 120° C. | 676/688 | 1223/1241 | 1852/1848 |
|  | 130° C. | 55/59 | 233/229 | 865/841 |
|  | 160° C. | 4.4/3.6 | 8.5/6.8 | 8.8/9.2 |
|  | 170° C. | 3.2/2.9 | 5.5/4.8 | 6.6/7.3 |
|  | Elongation at break at 160° C. (%) | 1786/1811 | 1566/1549 | 1432/1411 |
|  | T1 (° C.) | 120 | 127 | 128 |
|  | T2 (° C.) | 128 | 135 | 136 |
|  | T2 − T1 (° C.) | 8 | 8 | 8 |
|  | Thickness variation (%) | 4.2 | 3.8 | 3.9 |
| Evaluation | Quality | B | B | B |
|  | Appearance of surfaces | B | B | B |
|  | Coating performance | A | A | A |
|  | Process stability | D | D | D |
|  | Formability | S | S | S |
|  | Dimensional stability | C | B | A |
|  | Brittle resistance | A | A | A |
|  | Forming release property | A | A | A |

TABLE 2

|  |  | Example 4 | Example 5 | Example 6 |
|---|---|---|---|---|
| Constitution | Layer constitution | Layer A | Layer A | Layer A |
|  | Thickness (μm) | 100 | 100 | 100 |
|  | Thickness ratio (Layer B/Layer A) | — | — | — |
| Layer A | Composition (% by mass) | Cyclic olefin-based resin E (95% by mass) PE (5% by mass) | Cyclic olefin-based resin B (95% by mass) PE (5% by mass) | Cyclic olefin-based resin B (28% by mass) Cyclic olefin-based resin C (67% by mass) PE (5% by mass) |
|  | Glass transition temperature (° C.) | 135 | 140 | 150 |
| Layer B | Composition (% by mass) | — | — | — |
|  | Glass transition temperature (° C.) | — | — | — |
| Film composition | Cyclic olefin-based resin (% by mass) | 95% by mass | 95% by mass | 95% by mass |
|  | Metal salt of fatty acid (% by mass) | — | — | — |
|  | Antioxidizing agent (% by mass) | — | — | — |
| Film Properties | Storage modulus (MPa) 120° C. | 2312/2336 | 2344/2396 | 2413/2429 |
|  | 130° C. | 2120/2117 | 2187/2174 | 2377/2361 |
|  | 160° C. | 10/11 | 12/13 | 310/368 |
|  | 170° C. | 8.6/8.1 | 11/12 | 16/15 |
|  | Elongation at break at 160° C. (%) | 1377/1367 | 915/908 | 387/374 |
|  | T1 (° C.) | 136 | 141 | 155 |
|  | T2 (° C.) | 141 | 147 | 161 |
|  | T2 − T1 (° C.) | 5 | 6 | 6 |
|  | Thickness variation (%) | 3.5 | 3.4 | 3.2 |
| Evaluation | Quality | B | B | B |
|  | Appearance of surfaces | B | B | B |
|  | Coating performance | A | A | A |
|  | Process stability | D | D | D |
|  | Formability | S | A | B |
|  | Dimensional stability | S | S | S |
|  | Brittle resistance | A | A | A |
|  | Forming release property | A | A | A |

TABLE 3

|  |  | Example 7 | Example 8 | Example 9 |
|---|---|---|---|---|
| Constitution | Layer constitution | Layer A | Layer A | Layer A |
|  | Thickness (μm) | 100 | 100 | 100 |
|  | Thickness ratio (Layer B/Layer A) | — | — | — |

TABLE 3-continued

|  |  | Example 7 | Example 8 | Example 9 |
|---|---|---|---|---|
| Layer A | Composition (% by mass) | Cyclic olefin-based resin C (95% by mass) PE (5% by mass) | Cyclic olefin-based resin E (75% by mass) PE (25% by mass) | Cyclic olefin-based resin E (100% by mass) |
|  | Glass transition temperature (° C.) | 160 | 131 | 137 |
| Layer B | Composition (% by mass) | — | — | — |
|  | Glass transition temperature (° C.) | — | — | — |
| Film composition | Cyclic olefin-based resin (% by mass) | 95% by mass | 95% by mass | 100% by mass |
|  | Metal salt of fatty acid (% by mass) | — | — | — |
|  | Antioxidizing agent (% by mass) | — | — | — |
| Film Properties | Storage modulus 120° C. (MPa) | 2517/2556 | 2304/2312 | 2359/2363 |
|  | 130° C. | 2436/2444 | 1863/1796 | 2136/2144 |
|  | 160° C. | 1745/1788 | 11/11 | 12/11 |
|  | 170° C. | 96/89 | 7.1/7.5 | 9.5/9.3 |
|  | Elongation at break at 160° C. (%) | 185/176 | 1210/1207 | 1353/1329 |
|  | T1 (° C.) | 164 | 136 | 139 |
|  | T2 (° C.) | 169 | 145 | 145 |
|  | T2 − T1 (° C.) | 5 | 9 | 6 |
|  | Thickness variation (%) | 3.0 | 3.5 | 3.5 |
| Evaluation | Quality | B | B | C |
|  | Appearance of surfaces | B | C | A |
|  | Coating performance | A | A | A |
|  | Process stability | D | D | D |
|  | Formability | C | S | S |
|  | Dimensional stability | S | S | S |
|  | Brittle resistance | A | A | B |
|  | Forming release property | A | A | A |

TABLE 4

|  |  | Example 10 | Example 11 | Example 12 |
|---|---|---|---|---|
| Constitution | Layer constitution | Layer A | Layer A | Layer B/Layer A/Layer B |
|  | Thickness (μm) | 100 | 100 | 25/50/25 |
|  | Thickness ratio (Layer B/Layer A) | — | — | 1 |
| Layer A | Composition (% by mass) | Cyclic olefin-based resin E (99.9% by mass) Antioxidizing agent (0.1% by mass) | Cyclic olefin-based resin E (99.9% by mass) Metal salt of fatty acid (0.1% by mass) | Cyclic olefin-based resin A (38% by mass) Cyclic olefin-based resin B (57% by mass) PE (5% by mass) |
|  | Glass transition temperature (° C.) | 137 | 137 | 115 |
| Layer B | Composition (% by mass) | — | — | Cyclic olefin-based resin A (30% by mass) Cyclic olefin-based resin B (69.9% by mass) Antioxidizing agent (0.1% by mass) |
|  | Glass transition temperature (° C.) | — | — | 120 |
| Film composition | Cyclic olefin-based resin (% by mass) | 99.9% by mass | 99.9% by mass | 97.5% by mass |
|  | Metal salt of fatty acid (% by mass) | — | 0.1 | — |
|  | Antioxidizing agent (% by mass) | 0.1 | — | 0.05% by mass |
| Film Properties | Storage modulus 120° C. (MPa) | 2344/2353 | 2357/2361 | 398/378 |
|  | 130° C. | 2128/2140 | 2134/2147 | 49/47 |
|  | 160° C. | 11/11 | 11/11 | 3.6/3.1 |
|  | 170° C. | 9.1/9.1 | 9.4/9.4 | 2.1/2.4 |
|  | Elongation at break at 160° C. (%) | 1378/1366 | 1370/1359 | 1896/1922 |
|  | T1 (° C.) | 139 | 139 | 115 |
|  | T2 (° C.) | 145 | 145 | 126 |
|  | T2 − T1 (° C.) | 6 | 6 | 11 |
|  | Thickness variation (%) | 3.2 | 3.2 | 4.6 |
| Evaluation | Quality | A | A | A |
|  | Appearance of surfaces | A | A | A |
|  | Coating performance | A | A | A |
|  | Process stability | D | D | C |
|  | Formability | S | S | S |
|  | Dimensional stability | S | S | C |
|  | Brittle resistance | B | B | A |
|  | Forming release property | A | A | A |

TABLE 5

| | | Example 13 | Example 14 | Example 15 |
|---|---|---|---|---|
| Constitution | Layer constitution | Layer B/Layer A/Layer B | Layer B/Layer A/Layer B | Layer B/Layer A/Layer B |
| | Thickness (μm) | 20/60/20 | 20/60/20 | 20/60/20 |
| | Thickness ratio (Layer B/Layer A) | 0.67 | 0.67 | 0.67 |
| Layer A | Composition (% by mass) | Cyclic olefin-based resin A (29% by mass) Cyclic olefin-based resin B (66% by mass) PE (5% by mass) | Cyclic olefin-based resin A (19% by mass) Cyclic olefin-based resin B (76% by mass) PE (5% by mass) | Cyclic olefin-based resin A (9% by mass) Cyclic olefin-based resin B (86% by mass) PE (5% by mass) |
| | Glass transition temperature (° C.) | 120 | 125 | 130 |
| Layer B | Composition (% by mass) | Cyclic olefin-based resin A (20% by mass) Cyclic olefin-based resin B (79.9% by mass) Antioxidizing agent (0.1% by mass) | Cyclic olefin-based resin A (10% by mass) Cyclic olefin-based resin B (89.9% by mass) Antioxidizing agent (0.1% by mass) | Cyclic olefin-based resin A (10% by mass) Cyclic olefin-based resin B (89.9% by mass) Antioxidizing agent (0.1% by mass) |
| | Glass transition temperature (° C.) | 125 | 130 | 135 |
| Film composition | Cyclic olefin-based resin (% by mass) | 97% by mass | 97 % by mass | 97% by mass |
| | Metal salt of fatty acid (% by mass) | — | — | — |
| | Antioxidizing agent(% by mass) | 0.04% by mass | 0.04% by mass | 0.04% by mass |
| Film Properties | Storage modulus  120° C. (MPa) | 984/965 | 1513/1522 | 2017/2087 |
| | 130° C. | 198/184 | 544/523 | 1498/1482 |
| | 160° C. | 4.2/4.3 | 8.7/6.9 | 11/11 |
| | 170° C. | 2.6/2.8 | 5.7/5.0 | 9.8/9.3 |
| | Elongation at break at 160° C. (%) | 1765/1744 | 1523/1509 | 1487/1422 |
| | T1 (° C.) | 119 | 127 | 134 |
| | T2 (° C.) | 131 | 137 | 145 |
| | T2 − T1 (° C.) | 12 | 10 | 11 |
| | Thickness variation (%) | 4.2 | 4.4 | 3.2 |
| Evaluation | Quality | A | A | A |
| | Appearance of surfaces | A | A | A |
| | Coating performance | A | A | A |
| | Process stability | B | C | C |
| | Formability | S | S | S |
| | Dimensional stability | B | A | S |
| | Brittle resistance | A | A | A |
| | Forming release property | A | A | A |

TABLE 6

| | | Example 16 | Example 17 | Example 18 |
|---|---|---|---|---|
| Constitution | Layer constitution | Layer B/Layer A/Layer B | Layer B/Layer A/Layer B | Layer B/Layer A/Layer B |
| | Thickness (μm) | 20/60/20 | 20/60/20 | 20/60/20 |
| | Thickness ratio (Layer B/Layer A) | 0.67 | 0.67 | 0.67 |
| Layer A | Composition (% by mass) | Cyclic olefin-based resin A (9% by mass) Cyclic olefin-based resin B (86% by mass) PE (5% by mass) | Cyclic olefin-based resin A (9% by mass) Cyclic olefin-based resin B (86% by mass) PE (5% by mass) | Cyclic olefin-based resin A (9% by mass) Cyclic olefin-based resin B (86% by mass) PE (5% by mass) |
| | Glass transition temperature (° C.) | 130 | 130 | 130 |
| Layer B | Composition (% by mass) | Cyclic olefin-based resin B (99.9% by mass) Antioxidizing agent (0.1% by mass) | Cyclic olefin-based resin B (30% by mass) Cyclic olefin-based resin C (69.9% by mass) Annoxidizing agent (0.1% by mass) | Cyclic olefin-based resin C (99.9% by mass) Antioxidizing agent (0.1% by mass) |
| | Glass transition temperature (° C.) | 140 | 150 | 160 |
| Film composition | Cyclic olefin-based resin (% by mass) | 97% by mass | 97% by mass | 97% by mass |
| | Metal salt of fatty acid (% by mass) | — | — | — |
| | Antioxidizing agent (% by mass) | 0.04% by mass | 0.04% by mass | 0.04% by mass |
| Film Properties | Storage modulus  120° C. (MPa) | 2305/2287 | 2355/2367 | 2433/2443 |
| | 130° C. | 2100/2087 | 2217/2259 | 2387/2372 |
| | 160° C. | 11/11 | 153/174 | 923/874 |
| | 170° C. | 10/11 | 12/11 | 58/68 |
| | Elongation at break at 160° C. (%) | 1288/1247 | 915/908 | 387/374 |
| | T1 (° C.) | 137 | 140 | 145 |
| | T2 (° C.) | 152 | 157 | 164 |
| | T2 − T1 (° C.) | 15 | 17 | 19 |
| | Thickness variation (%) | 3.0 | 2.8 | 3.2 |
| Evaluation | Quality | A | A | A |
| | Appearance of surfaces | A | A | A |

TABLE 6-continued

|  | Example 16 | Example 17 | Example 18 |
|---|---|---|---|
| Coating performance | A | A | A |
| Process stability | A | A | A |
| Formability | S | A | B |
| Dimensional stability | S | S | S |
| Brittle resistance | A | A | A |
| Forming release property | A | A | A |

TABLE 7

| | | Example 19 | Example 20 | Example 21 |
|---|---|---|---|---|
| Constitution | Layer constitution | Layer B/Layer A/Layer B | Layer B/Layer A/Layer B | Layer B/Layer A |
| | Thickness (μm) | 20/60/20 | 10/80/10 | 40/60 |
| | Thickness ratio (Layer B/Layer A) | 0.67 | 0.25 | 0.67 |
| Layer A | Composition (% by mass) | Cyclic olefin-based resin A (9% by mass) Cyclic olefin-based resin B (86% by mass) PP (5% by mass) | Cyclic olefin-based resin A (9% by mass) Cyclic olefin-based resin B (86% by mass) PE (5% by mass) | Cyclic olefin-based resin A (9% by mass) Cyclic olefin-based resin B (86% by mass) PE (5% by mass) |
| | Glass transition temperature (° C.) | 130 | 130 | 130 |
| Layer B | Composition (% by mass) | Cyclic olefin-based resin A (10% by mass) Cyclic olefin-based resin B (89.9% by mass) Antioxidizing agent (0.1% by mass) | Cyclic olefin-based resin B (99.9% by mass) Antioxidizing agent (0.1% by mass) | Cyclic olefin-based resin B (99.9% by mass) Antioxidizing agent (0.1% by mass) |
| | Glass transition temperature (° C.) | 135 | 140 | 140 |
| Film composition | Cyclic olefin-based resin (% by mass) | 97% by mass | 97% by mass | 97% by mass |
| | Metal salt of fatty acid (% by mass) | — | — | — |
| | Antioxidizing agent (% by mass) | 0.04% by mass | 0.04% by mass | 0.04% by mass |
| Film Properties | Storage modulus 120° C. (MPa) | 2003/2041 | 2147/2155 | 2311/2280 |
| | 130° C. | 1456/1463 | 1957/1963 | 2113/2070 |
| | 160° C. | 10/11 | 10/11 | 11/12 |
| | 170° C. | 9.0/9.1 | 9.3/9.6 | 10/11 |
| | Elongation at break at 160° C. (%) | 1487/1422 | 1368/1389 | 1230/1249 |
| | T1 (° C.) | 135 | 135 | 137 |
| | T2 (° C.) | 146 | 147 | 152 |
| | T2 − T1 (° C.) | 11 | 12 | 15 |
| | Thickness variation (%) | 3.2 | 3.0 | 3.0 |
| Evaluation | Quality | A | A | A |
| | Appearance of surfaces | A | A | A |
| | Coating performance | A | A | A |
| | Process stability | C | B | A |
| | Formability | S | S | S |
| | Dimensional stability | S | S | S |
| | Brittle resistance | A | A | A |
| | Forming release property | A | A | A |

TABLE 8

| | | Example 22 | Example 23 | Example 24 |
|---|---|---|---|---|
| Constitution | Layer constitution | Layer B/Layer A/Layer B | Layer B/Layer A/Layer B | Layer B/Layer A/Layer B |
| | Thickness (μm) | 40/120/40 | 20/60/20 | 20/60/20 |
| | Thickness ratio (Layer B/Layer A) | 0.67 | 0.67 | 0.67 |
| Layer A | Composition (% by mass) | Cyclic olefin-based resin A (9% by mass) Cyclic olefin-based resin B (86% by mass) PE (5% by mass) | Cyclic olefin-based resin A (9% by mass) Cyclic olefin-based resin B (86% by mass) PE (5% by mass) | Cyclic olefin-based resin A (9% by mass) Cyclic olefin-based resin B (86% by mass) PE (5% by mass) |
| | Glass transition temperature (° C.) | 130 | 130 | 130 |
| Layer B | Composition (% by mass) | Cyclic olefin-based resin B (99.9% by mass) Antioxidizing agent (0.1% by mass) | Cyclic olefin-based resin A (10% by mass) Cyclic olefin-based resin B (89.9% by mass) Antioxidizing agent (0.1% by mass) | Cyclic olefin-based resin A (10% by mass) Cyclic olefin-based resin B (89.9% by mass) Antioxidizing agent (0.1% by mass) |
| | Glass transition temperature (° C.) | 140 | 135 | 135 |

TABLE 8-continued

|  |  | Example 22 | Example 23 | Example 24 |
|---|---|---|---|---|
| Film composition | Cyclic olefin-based resin (% by mass) | 97% by mass | 97% by mass | 97% by mass |
|  | Metal salt of fatty acid (% by mass) | — | — | — |
|  | Antioxidizing agent (% by mass) | 0.04% by mass | 0.04% by mass | 0.04% by mass |
| Film Properties | Storage modulus (MPa) 120° C. | 2325/2274 | 2010/2056 | 2021/2083 |
|  | 130° C. | 2132/2080 | 1481/1476 | 1433/1441 |
|  | 160° C. | 11/10 | 11/10 | 11/10 |
|  | 170° C. | 11/10 | 9.4/9.0 | 9.6/9.2 |
|  | Elongation at break at 160° C. (%) | 1311/1320 | 1466/1451 | 1427/1424 |
|  | T1 (° C.) | 137 | 134 | 134 |
|  | T2 (° C.) | 152 | 145 | 145 |
|  | T2 − T1 (° C.) | 15 | 11 | 11 |
|  | Thickness variation (%) | 3.0 | 5.7 | 8.2 |
| Evaluation | Quality | A | A | A |
|  | Appearance of surfaces | A | A | A |
|  | Coating performance | A | B | C |
|  | Process stability | A | C | C |
|  | Formability | S | S | S |
|  | Dimensional stability | S | S | S |
|  | Brittle resistance | A | A | A |
|  | Forming release property | A | A | A |

TABLE 9

|  |  | Example 25 | Example 26 | Example 27 |
|---|---|---|---|---|
| Constitution | Layer constitution | Layer B/Layer A/Layer B | Layer B/Layer A/Layer B | Layer B/Layer A/Layer B |
|  | Thickness (μm) | 20/60/20 | 20/60/20 | 20/60/20 |
|  | Thickness ratio (Layer B/Layer A) | 0.67 | 0.67 | 0.67 |
| Layer A | Composition (% by mass) | Cyclic olefin-based resin A (9% by mass) Cyclic olefin based resin B (86% by mass) PE (5% by mass) | Cyclic olefin-based resin B (95% by mass) PE (5% by mass) | Cyclic olefin-based resin B (28% by mass) Cyclic olefin-based resin C (67% by mass) PE (5% by mass) |
|  | Glass transition temperature (° C.) | 130 | 140 | 150 |
| Layer B | Composition (% by mass) | Cyclic olefin-based resin A (10% by mass) Cyclic olefin-based resin B (89.9% by mass) Antioxidizing agent (0.1% by mass) | Cyclic olefin-based resin B (30% by mass) Cyclic olefin-based resin C (69.9% by mass) Antioxidizing agent (0.1% by mass) | Cyclic olefin-based resin C (99.9% by mass) Antioxidizing agent (0.1% by mass) |
|  | Glass transition temperature (° C.) | 135 | 150 | 160 |
| Film composition | Cyclic olefin-based resin (% by mass) | 97% by mass | 97% by mass | 97% by mass |
|  | Metal salt of fatty acid (% by mass) | — | — | — |
|  | Antioxidizing agent (% by mass) | 0.04% by mass | 0.04% by mass | 0.04% by mass |
| Film Properties | Storage modulus (MPa) 120° C. | 2017/2087 | 2377/2402 | 2471/2467 |
|  | 130° C. | 1469/1487 | 2227/2226 | 2403/2422 |
|  | 160° C. | 11/11 | 88/96 | 642/667 |
|  | 170° C. | 9.0/9.1 | 12/13 | 55/49 |
|  | Elongation at break at 160° C. (%) | 1411/1430 | 624/684 | 296/276 |
|  | T1 (° C.) | 134 | 144 | 156 |
|  | T2 (° C.) | 145 | 159 | 169 |
|  | T2 − T1 (° C.) | 11 | 15 | 13 |
|  | Thickness variation (%) | 11.9 | 3.3 | 3.1 |
| Evaluation | Quality | A | A | A |
|  | Appearance of surfaces | A | A | A |
|  | Coating performance | D | A | A |
|  | Process stability | C | A | B |
|  | Formability | S | A | C |
|  | Dimensional stability | S | S | S |
|  | Brittle resistance | A | A | A |
|  | Forming release property | A | A | A |

TABLE 10

|  |  | Example 28 | Comparative Example 1 | Comparative Example 2 |
|---|---|---|---|---|
| Constitution | Layer constitution | Layer B/Layer A/Layer B | Layer B/Layer A/Layer B | Layer A |
|  | Thickness (μm) | 20/60/20 | 10/80/10 | 100 |
|  | Thickness ratio (Layer B/Layer A) | 0.67 | 0.67 | — |

TABLE 10-continued

|  |  | Example 28 | Comparative Example 1 | Comparative Example 2 |
|---|---|---|---|---|
| Layer A | Composition (% by mass) | Cyclic olefin-based resin C (95% by mass) PE (5% by mass) | Cyclic olefin-based resin A (38% by mass) Cyclic olefin-based resin B (57% by mass) PE (5% by mass) | Cyclic olefin-based resin E (28% by mass) Cyclic olefin-based resin F (67% by mass) PE (5% by mass) |
|  | Glass transition temperature (° C.) | 160 | 115 | 172 |
| Layer B | Composition (% by mass) | Cyclic olefin-based resin C (99.9% by mass) Antioxidizing agent (0.1% by mass) | Cyclic olefin-based resin A (30% by mass) Cyclic olefin-based resin B (69.9% by mass) Antioxidizing agent (0.1% by mass) | — |
|  | Glass transition temperature (° C.) | 160 | 120 | — |
| Film composition | Cyclic olefin-based resin (% by mass) | 97% by mass | 97% by mass | 95% by mass |
|  | Metal salt of fatty acid (% by mass) | — | — | — |
|  | Antioxidizing agent (% by mass) | 0.04% by mass | 0.04% by mass | — |
| Film Properties | Storage modulus 120° C. (MPa) | 2527/2577 | 98/95 | 2633/2654 |
|  | 130° C. | 2458/2459 | 13/14 | 2512/2527 |
|  | 160° C. | 1757/1787 | 2.2/2.5 | 1987/1936 |
|  | 170° C. | 154/163 | 1.6/1.9 | 374/368 |
|  | Elongation at break at 160° C. (%) | 185/176 | 2041/2063 | 31/26 |
|  | T1 (° C.) | 166 | 109 | 169 |
|  | T2 (° C.) | 171 | 119 | 174 |
|  | T2 − T1 (° C.) | 5 | 10 | 5 |
|  | Thickness variation (%) | 3.0 | 4.8 | 3.0 |
| Evaluation | Quality | A | A | B |
|  | Appearance of surfaces | A | A | B |
|  | Coating performance | A | A | A |
|  | Process stability | D | C | D |
|  | Formability | C | S | D |
|  | Dimensional stability | S | D | S |
|  | Brittle resistance | A | A | A |
|  | Forming release property | A | A | A |

TABLE 11

|  |  | Comparative Example 3 | Comparative Example 4 | Comparative Example 5 |
|---|---|---|---|---|
| Constitution | Layer constitution | Layer A | Layer B/Layer A/Layer B | Layer A |
|  | Thickness (μm) | 100 | 20/60/20 | 100 |
|  | Thickness ratio (Layer B/Layer A) | — | 0.67 | — |
| Layer A | Composition (% by mass) | Cyclic olefin-based resin A (28% by mass) Cyclic olefin-based resin B (67% by mass) PE (5% by mass) | Cyclic olefin-based resin E (28% by mass) Cyclic olefin-based resin F (67% by mass) PE (5% by mass) | Cyclic olefin-based resin A (5% by mass) Cyclic olefin-based resin B (40% by mass) PP (55% by mass) |
|  | Glass transition temperature (° C.) | 115 | 172 | 125 |
| Layer B | Composition (% by mass) | — | Cyclic olefin-based resin E (30% by mass) Cyclic olefin-based resin F (69.9% by mass) Antioxidizing agent (0.1% by mass) | — |
|  | Glass transition temperature (° C.) | — | 174 | — |
| Film composition | Cyclic olefin-based resin (% by mass) | 95% by mass | 97% by mass | 45% by mass |
|  | Metal salt of fatty acid (% by mass) | — | — | — |
|  | Antioxidizing agent (% by mass) | — | 0.04% by mass | — |
| Film Properties | Storage modulus 120° C. (MPa) | 63/67 | 2714/2747 | 1233/1302 |
|  | 130° C. | 10./11 | 2567/2546 | 631/641 |
|  | 160° C. | 2.1/2.4 | 2039/2069 | 6.4/6.6 |
|  | 170° C. | 1.2/1.4 | 496/476 | 4.2/4.4 |
|  | Elongation at break at 160° C. (%) | 2122/2138 | 20/18 | 1024/1073 |
|  | T1 (° C.) | 108 | 169 | 124 |
|  | T2 (° C.) | 116 | 176 | 138 |
|  | T2 − T1 (° C.) | 8 | 7 | 14 |
|  | Thickness variation (%) | 4.8 | 3.0 | 8.7 |
| Evaluation | Quality | B | A | A |
|  | Appearance of surfaces | B | A | D |
|  | Coating performance | A | A | C |
|  | Process stability | D | D | B |
|  | Formability | S | D | C |

TABLE 11-continued

|  | Comparative Example 3 | Comparative Example 4 | Comparative Example 5 |
|---|---|---|---|
| Dimensional stability | D | S | D |
| Brittle resistance | A | A | A |
| Forming release property | A | A | A |

TABLE 12

|  |  | Example 29 | Example 30 |
|---|---|---|---|
| Constitution | Layer constitution | Layer B/Layer A/Layer B | Layer B/Layer A/Layer B |
|  | Thickness (μm) | 20/60/20 | 20/60/20 |
|  | Thickness ratio (Layer B/Layer A) | 0.67 | 0.67 |
| Layer A | Composition (% by mass) | Cyclic olefin-based resin A (9% by mass) Cyclic olefin-based resin B (86% by mass) PE (5% by mass) | Cyclic olefin-based resin A (9% by mass) Cyclic olefin-based resin B (86% by mass) PE (5% by mass) |
|  | Glass transition temperature (° C.) | 130 | 130 |
| Layer B | Composition (% by mass) | Cyclic olefin-based resin B (99.9% by mass) Antioxidizing agent (0.1% by mass) | Cyclic olefin-based resin B (99.9% by mass) Antioxidizing agent (0.1% by mass) |
|  | Glass transition temperature (° C.) | 140 | 140 |
| Film composition | Cyclic olefin-based resin (% by mass) | 97% by mass | 97% by mass |
|  | Metal salt of fatty acid (% by mass) | — | — |
|  | Antioxidizing agent (% by mass) | 0.04% by mass | 0.04% by mass |
| Film Properties | Storage modulus (MPa) 120° C. | 2305/2287 | 2305/2287 |
|  | 130° C. | 2100/2087 | 2100/2087 |
|  | 160° C. | 11/11 | 11/11 |
|  | 170° C. | 10/11 | 10/11 |
|  | Tensile elongation at break at 160° C. (%) | 1288/1247 | 1288/1247 |
|  | T1 (° C.) | 137 | 137 |
|  | T2 (° C.) | 152 | 152 |
|  | T2 − T1 (° C.) | 15 | 15 |
|  | Thickness variation (%) | 3.0 | 3.0 |
|  | Surface X  SRa (nm) | 9 | 10 |
|  | SRmax (nm) | 95 | 105 |
|  | Surface Y  SRa (nm) | 8 | 150 |
|  | SRmax (nm) | 94 | 1450 |
| Evaluation | Quality | A | A |
|  | Appearance of surfaces | A | A |
|  | Coating performance | A | A |
|  | Process stability | A | A |
|  | Winding property | B | A |
|  | Formability | S | S |
|  | Dimensional stability | S | S |
|  | Brittle resistance | A | A |
|  | Forming release property | A | A |
|  | Appearance of surfaces of formed body | A | A |

TABLE 13

|  |  | Example 31 | Example 32 |
|---|---|---|---|
| Constitution | Layer constitution | Layer B/Layer A/Layer B | Layer B/Layer A/Layer B |
|  | Thickness (μm) | 20/60/20 | 20/60/20 |
|  | Thickness ratio (Layer B/Layer A) | 0.67 | 0.67 |
| Layer A | Composition (% by mass) | Cyclic olefin-based resin A (9% by mass) Cyclic olefin-based resin B (86% by mass) PE (5% by mass) | Cyclic olefin-based resin A (9% by mass) Cyclic olefin-based resin B (86% by mass) PE (5% by mass) |
|  | Glass transition temperature (° C.) | 130 | 130 |

TABLE 13-continued

|  |  | Example 31 | Example 32 |
|---|---|---|---|
| Layer B | Composition (% by mass) | Cyclic olefin-based resin B (99.9% by mass) Antioxidizing agent (0.1% by mass) | Cyclic olefin-based resin B (99.9% by mass) Antioxidizing agent (0.1% by mass) |
|  | Glass transition temperature (° C.) | 140 | 140 |
| Film composition | Cyclic olefin-based resin (% by mass) | 97% by mass | 97% by mass |
|  | Metal salt of fatty acid (% by mass) | — | — |
|  | Antioxidizing agent (% by mass) | 0.04% by mass | 0.04% by mass |
| Film Properties | Storage modulus 120° C. (MPa) | 2305/2287 | 2305/2287 |
|  | 130° C. | 2100/2087 | 2100/2087 |
|  | 160° C. | 11/11 | 11/11 |
|  | 170° C. | 10/11 | 10/11 |
|  | Tensile elongation at break at 160° C. (%) | 1288/1247 | 1288/1247 |
|  | T1 (° C.) | 137 | 137 |
|  | T2 (° C.) | 152 | 152 |
|  | T2 − T1 (° C.) | 15 | 15 |
|  | Thickness variation (%) | 3.0 | 3.0 |
|  | Surface X SRa (nm) | 11 | 110 |
|  | SRmax (nm) | 122 | 1150 |
|  | Surface Y SRa (nm) | 587 | 1520 |
|  | SRmax (nm) | 6010 | 15600 |
| Evaluation | Quality | A | A |
|  | Appearance of surfaces | A | A |
|  | Coating performance | A | A |
|  | Process stability | A | A |
|  | Winding property | A | A |
|  | Formability | S | S |
|  | Dimensional stability | S | S |
|  | Brittle resistance | A | A |
|  | Forming release property | A | A |
|  | Appearance of surfaces of formed body | B | C |

It is noted here that, with regard to the storage modulus and the tensile elongation at break, the above tables show the measurement results that were obtained for both an arbitrary direction of the subject film and the direction perpendicular thereto.

The film for forming of the present invention preferably comprises a cyclic olefin-based resin as a main component and has a storage modulus of 101 MPa to 3,000 MPa at 120° C. and 100 MPa or less at 170° C. By having this constitution, the film for forming of the present invention shows excellent dimensional stability in processings such as coating, lamination, printing and vapor-deposition and, by elevating the forming temperature in a variety of forming methods such as vacuum forming, pressure forming and press forming, the film for forming of the present invention can achieve good formability. Therefore, the film for forming of the present invention can be applied to a variety of forming processes and suitably used in, for example, decoration of forming members of building materials, automotive components, cellular phones, electric appliances, amusement machine parts and the like.

The invention claimed is:

1. A film for forming, comprising a cyclic olefin-based resin as a main component,
wherein the storage modulus at 120° C. is 101 MPa to 3,000 MPa and the storage modulus at 170° C. is 100 MPa or less, wherein the film for forming is a laminated film in which a cyclic olefin layer (layer B) comprising a cyclic olefin-based resin as a main component is laminated on at least one side of a cyclic olefin layer (layer A) comprising a cyclic olefin-based resin as a main component,
wherein said layer A comprises a polyethylene-based resin and/or a polypropylene-based resin in an amount of 1 to 40% by mass with respect to 100% by mass of the whole layer A,
wherein one surface of said film (surface X) has a surface roughness (SRa) of 2 nm to less than 50 nm and the other surface (surface Y) has a surface roughness (SRa) of 50 nm to 1,000 nm, and
wherein one surface of said film (surface X) has a surface roughness (SRmax) of 20 nm to less than 500 nm and the other surface (surface Y) has a surface roughness (SRmax) of 500 nm to 10,000 nm.

2. The film for forming according to claim 1, having a three-layer constitution of said layer B/said layer A/said layer B.

3. The film for forming according to claim 1, wherein the glass transition temperature of said layer B is higher than that of said layer A.

4. The film for forming according to claim 1, wherein the glass transition temperature of said layer A is 111° C. to 165° C.

5. The film for forming according to claim 1, wherein the glass transition temperature of said layer B is 115° C. to 170° C. and higher than that of said layer A.

6. The film for forming according to claim 1, wherein a temperature at which the storage modulus is 1,000 MPa (T1: ° C.) and a temperature at which the storage modulus is 100 MPa (T2: ° C.) satisfy the following formula (I):

$$T2 - T1 \geq 10 \tag{I}$$

7. The film for forming according to claim 3, wherein thickness ratio of said layer A and said layer B (total thickness of said layer B/total thickness of said layer A) is 0.25 to 1.

8. The film for forming according to claim 1, which contains an antioxidizing agent and/or a metal salt of a fatty acid in an amount of 0.005% by mass to 0.5% by mass with respect to 100% by mass of all components contained in said film.

9. The film for forming according to claim 1, which has a tensile elongation at break of not less than 300% at 160° C. in at least one direction.

10. The film for forming according to claim 1, which is a film for a forming transfer foil.

11. A forming transfer foil, sequentially comprising a clear coated layer, a decoration layer and an adhesion layer on at least one side of the film for forming according to claim 1.

* * * * *